(12) United States Patent
Kasmer

(10) Patent No.: US 6,612,117 B2
(45) Date of Patent: Sep. 2, 2003

(54) HYDRISTOR HEAT PUMP

(76) Inventor: Thomas E. Kasmer, P.O. Box 779, Johnson City, NY (US) 13790

( * ) Notice: Subject to any disclaimer, the term of this patent is extended or adjusted under 35 U.S.C. 154(b) by 0 days.

(21) Appl. No.: 10/079,386

(22) Filed: Feb. 20, 2002

(65) Prior Publication Data

US 2002/0112485 A1 Aug. 22, 2002

Related U.S. Application Data

(60) Provisional application No. 60/270,005, filed on Feb. 20, 2001.

(51) Int. Cl.[7] ............... F25B 9/00; F25B 13/00; F25B 1/00
(52) U.S. Cl. ............... 62/6; 62/498; 62/324.6
(58) Field of Search ............... 62/6, 324.6, 401, 62/402, 278.2, 498

(56) References Cited

U.S. PATENT DOCUMENTS

| | | | | |
|---|---|---|---|---|
| 2,589,449 A | | 3/1952 | Stageberg | 103/136 |
| 2,976,698 A | * | 3/1961 | Muffly | 62/160 |
| 3,153,984 A | * | 10/1964 | Fikse | 418/156 |
| 4,175,398 A | * | 11/1979 | Edwards et al. | 62/149 |
| 4,175,399 A | * | 11/1979 | Edwards et al. | 62/172 |
| 4,175,400 A | * | 11/1979 | Edwards et al. | 62/174 |
| 4,241,591 A | * | 12/1980 | Edwards | 62/402 |
| 4,367,638 A | | 1/1983 | Gray | 62/324.6 |
| 4,414,812 A | * | 11/1983 | Parry | 126/573 |
| 5,216,899 A | | 6/1993 | Fabris | 62/324.6 |
| 5,239,833 A | * | 8/1993 | Fineblum | 62/401 |
| 5,595,067 A | * | 1/1997 | Maness | 418/30 |
| 5,642,620 A | * | 7/1997 | Bakker | 418/196 |
| 5,901,568 A | * | 5/1999 | Haga | 165/86 |
| 5,924,305 A | * | 7/1999 | Hill | 60/671 |
| 5,934,076 A | | 8/1999 | Coney | 60/2 |
| 6,019,168 A | | 2/2000 | Kinnersly | 165/28 |
| 6,022,201 A | * | 2/2000 | Kasmer | 418/1 |
| 6,109,040 A | * | 8/2000 | Ellison et al. | 62/6 |
| 6,161,381 A | | 12/2000 | Lohrmann | 60/1 |
| 6,195,992 B1 | | 3/2001 | Nommensen | 60/1 |
| 6,263,671 B1 | | 7/2001 | Bliesner | 60/1 |
| 6,325,140 B1 | | 12/2001 | Na et al. | 165/28 |
| 6,336,336 B1 | | 1/2002 | Kawminmi et al. | 62/25 |
| 6,336,501 B1 | | 1/2002 | Ishikawa et al. | 165/28 |
| 6,338,248 B1 | | 1/2002 | Waidner et al. | 60/1 |
| 6,340,052 B1 | | 1/2002 | Uehara | 165/28 |
| 6,340,055 B1 | | 1/2002 | Yamauchi et al. | 165/28 |
| 6,340,856 B1 | | 1/2002 | Schiller | 310/1 |
| 6,341,650 B2 | | 1/2002 | Carpentier | 165/28 |
| 6,342,739 B1 | | 1/2002 | Furuya et al. | 310/2 |
| 6,343,877 B1 | | 2/2002 | Miura et al. | 384/16 |
| 6,345,600 B1 | | 2/2002 | Schneider | 123/2 |
| 6,346,810 B2 | | 2/2002 | Cho et al. | 324/1 |

* cited by examiner

*Primary Examiner*—William C. Doerrler
(74) *Attorney, Agent, or Firm*—Dinnin & Dunn, P.C.

(57) ABSTRACT

A heat pump system 160 contains a hydristor pump/motor 162 in fluid and thermodynamic communication with a first heat exchanger 172 communicating with a relatively warm reservoir 174, and a second heat exchanger 176 thermodynamically communicating with a relatively cold reservoir 178, whereby the hydristor 162 and the first and second heat exchangers 172 and 176 are integral to and in fluid communication with a closed compressible fluid loop 164. A Stirling engine 178a or a home heating system or any other cold reservoir may, for example, utilize heat transferred from the second heat exchanger 176 thereby providing a reduction in energy usage and costs heretofore unrealized

7 Claims, 17 Drawing Sheets

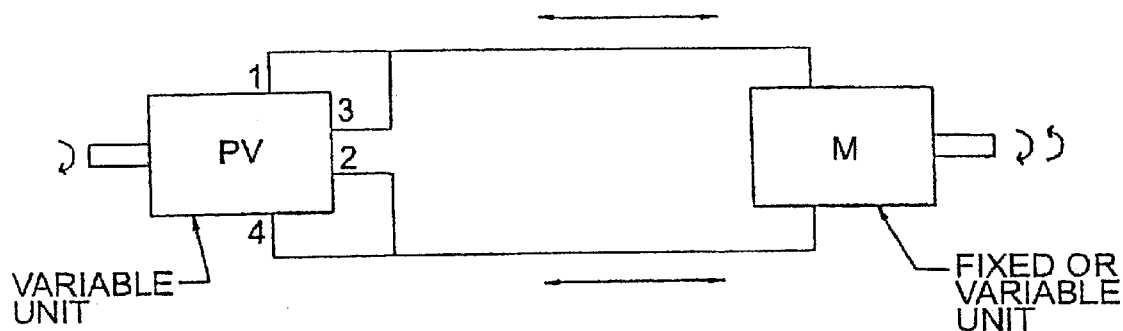
Figure 8
Figure 9
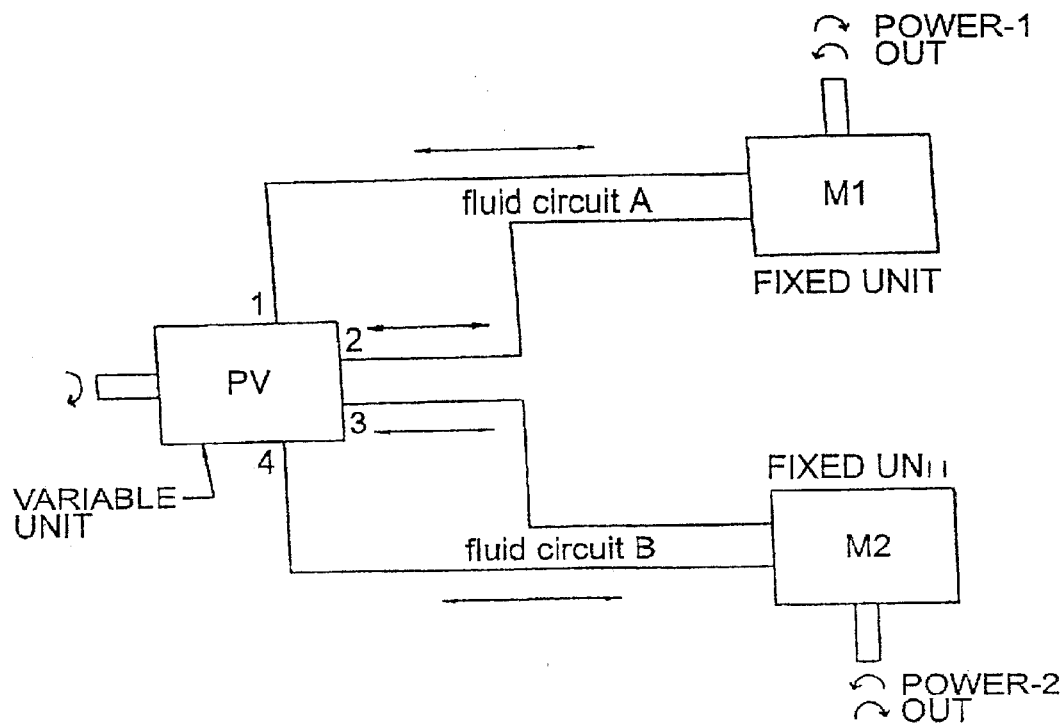

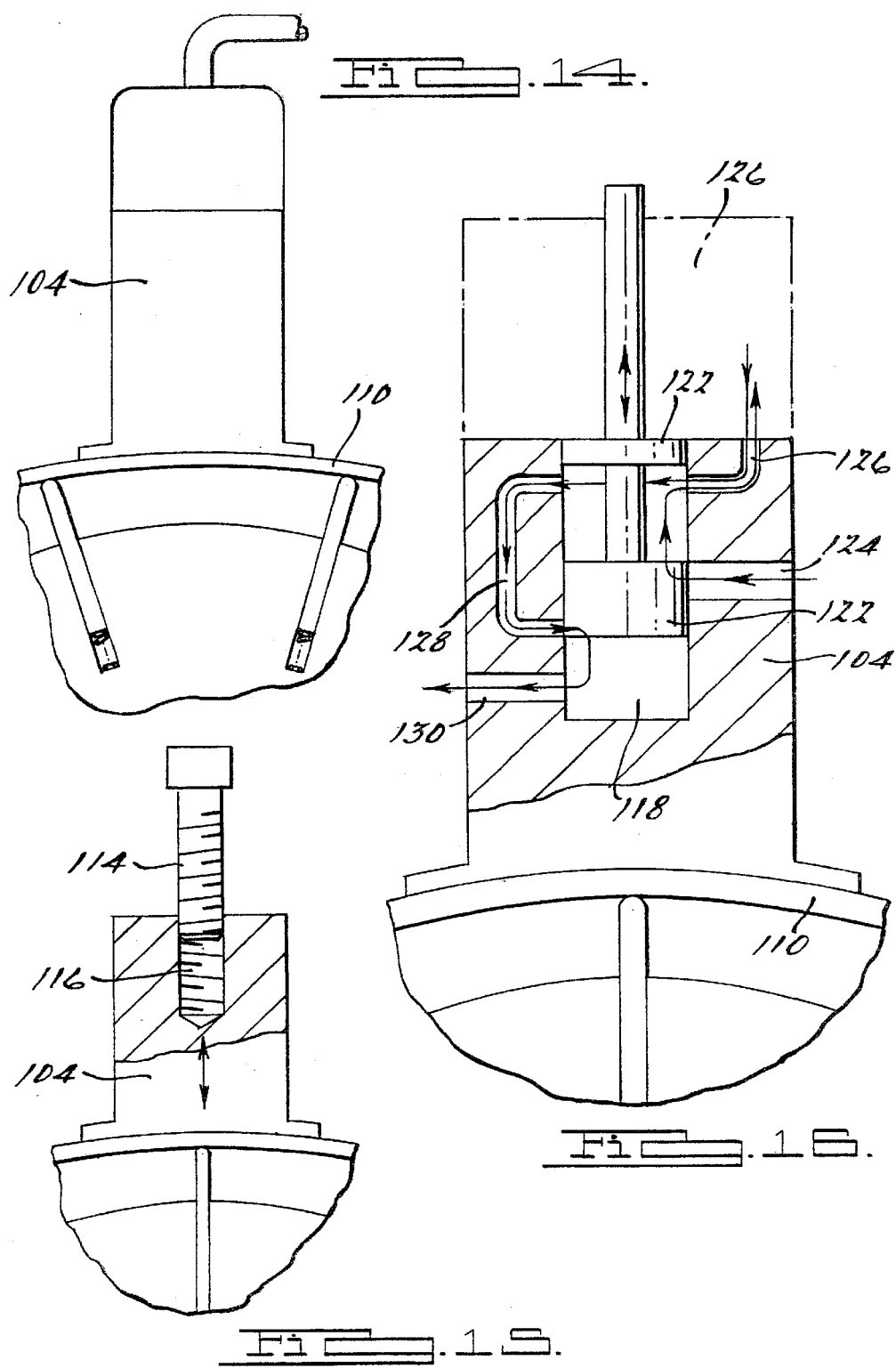

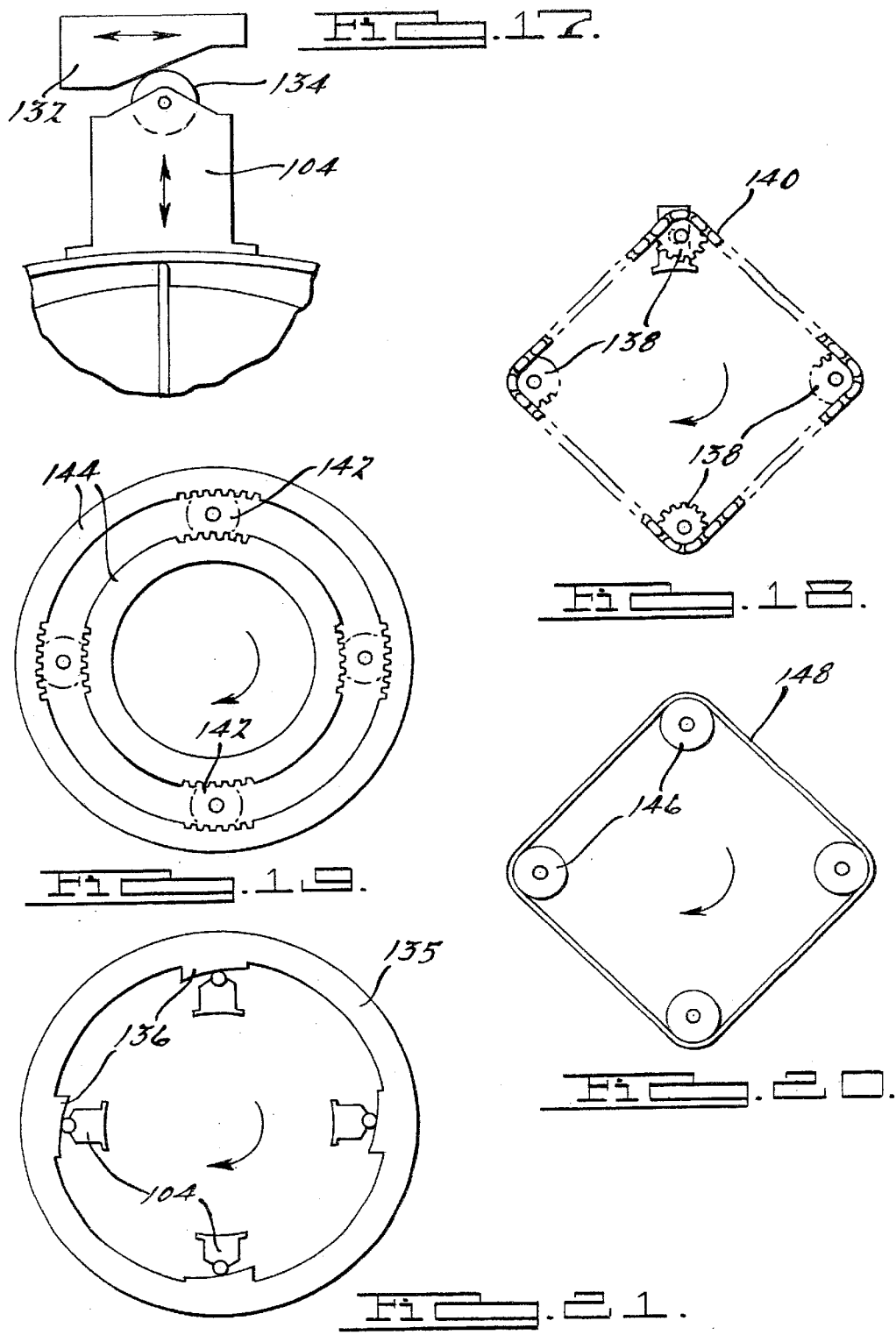

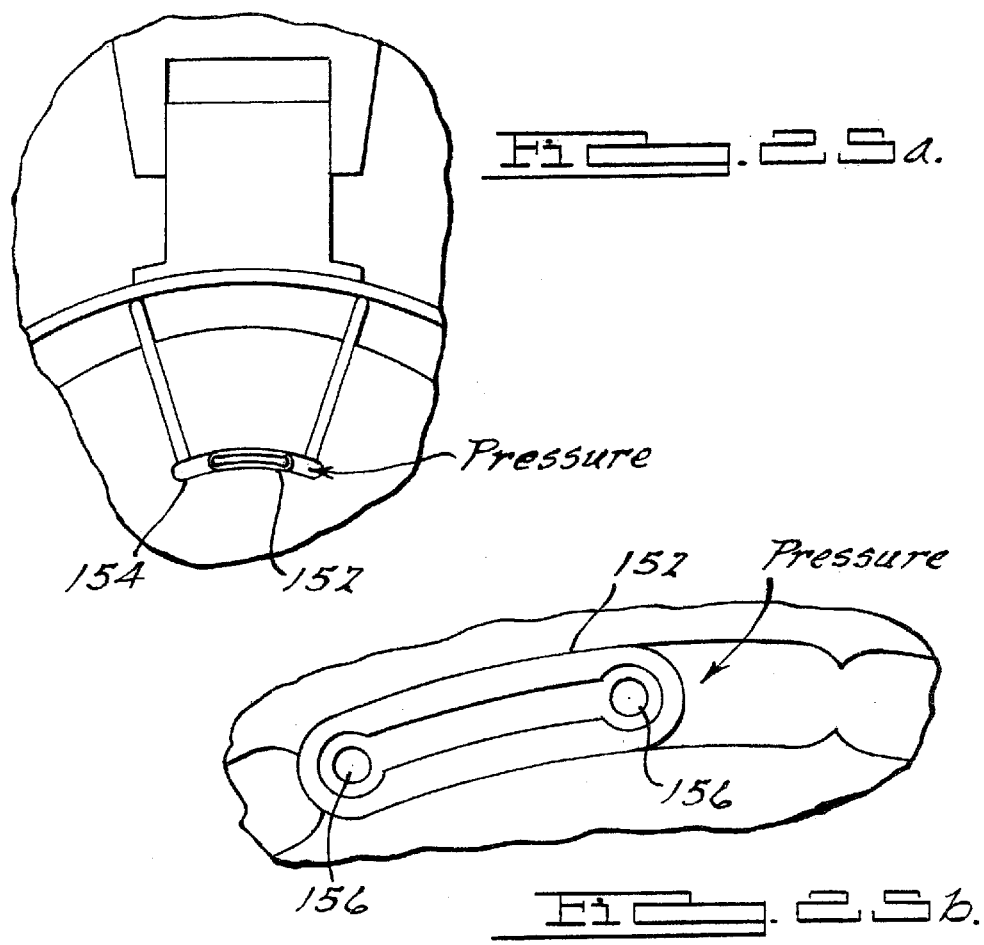
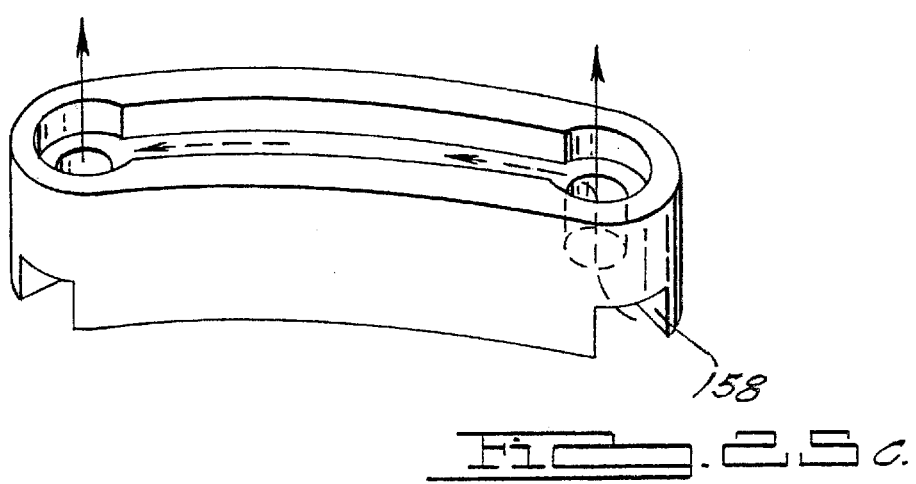

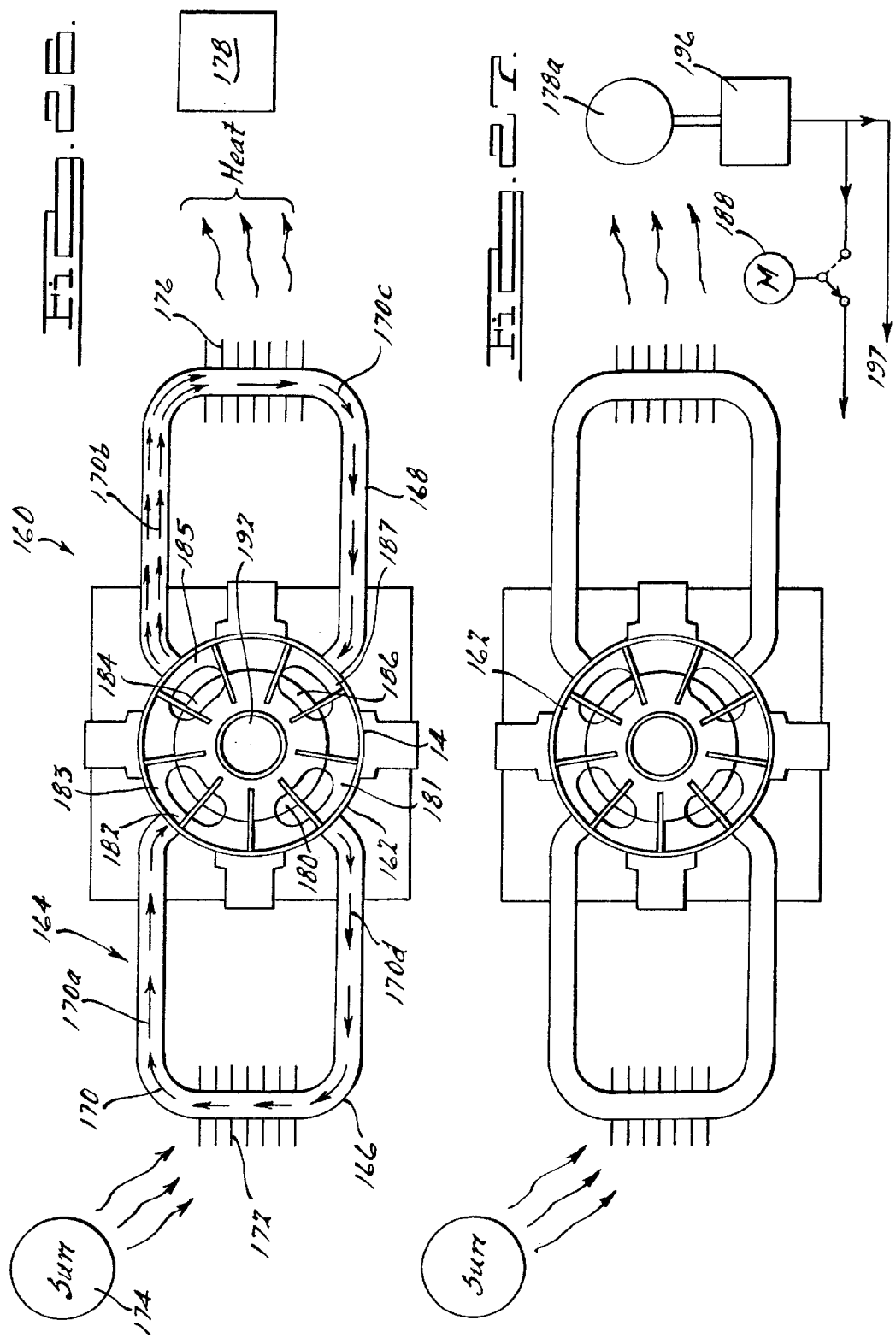

HYDRISTOR HEAT PUMP

This application claims the benefit of U.S. Provisional Application Serial No. 60/270,005 filed Feb. 20, 2001.

BACKGROUND OF INVENTION

This application incorporates by reference related patents U.S. Pat. Nos. 6,022,201; 3,153,984; and 2,589,449, and, GB Patent No. 1,000,591 each in their entirety.

Early devices to vary the displacement of vane pumps involved the deliberate offset of the rotational center of the vane rotor with respect to the geometrical center of the circular outer case. The amount of offset would then control the swept volume of the pump and thereby provide a desired volumetric output for each rotation of the rotor. Several problems with this design limited its use.

First, the pressure unbalance caused by the hydraulic-based force on the radial cross-section of the rotor and vanes at the axis viewed from the radial perspective severely limited the power capability and power density of these pumps and resulted in very heavy, inefficient, and cumbersome devices. Second, the centrifugal force of each vane during high-speed rotation caused severe wear of the vane outer edge and the inner surface of the outer containment housing.

Later fixed displacement design were conceived around the concept of pressure balance in which two geometrically opposed high pressure chambers would cause a cancellation of radial load due to equal and opposed cross-section pressure areas and opposite vector direction which resulted in a zero net force radially on the shaft bearing. The design is referred to as the pressure balanced vane pump or motor. Typical efficiency of these devices is 70 to 85% under rated loading and speed. Still later improvements include changing the chamber shape of pressure balanced vane style devices and involved the use of several types of adjustable inner surfaces of the outer housing for guiding and radially adjusting the vanes as they rotate. One improvement is a continuous band, which is flexible and subject to radial deformation so as to cause displacement control of the vanes. However, these flexible bands did not rotate.

Classical freon heat pumps utilize an expansion valve to rarify the freon and drop its temperature to −40° F. The expansion valve represents a large loss of mechanical energy relative to the overall system performance due to shear heating effects as the fluid is discharged through the valve. In spite of that, common recoveries or amplifications of the electrical energy input to drive the system is achieved by as high as 300%. Nevertheless, improvements reducing the mechanical loss would certainly result in greater efficiency.

SUMMARY OF INVENTION

The basic embodiment of this invention is a rotor with spring-biased, radially extensible vanes that are constrained in their outward radial movement, away from the rotor center of rotation, by the inner circumferential area of a continuous flexible band that has the same axial width as the rotor and vanes. It is especially important to notice in the basic embodiment that the flexible band is designed to rotate with the vanes and rotor. The spring loading of the vanes is by conventional means as is the practice with existing vane pumps and motors; namely that the spring is compressed between the rotor itself and the radially inward edge of the vane so as to drive every vane radially out from the rotor body against the inner area of the flexible band. Other spring assemblies that accomplish the same function are also contemplated. The spring preload causes the vanes to contact the flexible band inside surface at slow speeds that include zero. This is especially important if this embodiment is to be used as a variable or fixed displacement hydraulic motor because hydraulic sealing of the vane's outer edge is assured at zero speed. Since the flexible band is totally free to rotate with the vanes and rotor, a very big source of friction, wear, and inefficiency is eliminated due to the teaching of this invention. The well known limitation of the prior art; namely the sliding edge friction associated with the combined outward radial force of the vanes is totally eliminated since there is substantially no relative motion between outside edges of the vanes and the interior constraining surface of the flexible containment band. Further, as the rotor's speed increases, the speed-squared radially outward combined force of the set of vanes is fully contained by the continuity of the flexible band simulating a pressure-vessel type of containment, as if the flexible band were a cross section of a pressure containment cylinder, and the individual radial outward force of the vanes were the pictorial radially outward arrows that are used in drawings to depict the action of the force which is contained. Since the action of the flexible band is to fully contain these combined radial forces of the vanes, there is absolutely no increase of frictional forces due to increasing radial vane force, and this invention solves a very severe limitation of the prior art in that the rotating speed of the fixed devices built according to the prior art is limited to about 4,000 revolutions per minute, while the upper speed limit of the subject invention is substantially higher, say to the range of 30,000 revolutions per minute, governed largely by the design strength and durability of the flexible band. In fact, testing showed that the efficiency of this invention utilizing the rotating components of a commercially available pump having an advertised efficiency of 88% resulted in efficiency measurements of 93.5 to 94.7% when used in combination with the rotating flexible band. The greater efficiency of the instant invention over the prior art will result in much smaller variable pumps and motors in severe applications such as spacecraft. The flexible band design and construction can cover a wide range of variables, from a single circumferentially continuous flexible band to concentric nesting of any practical number of individual circumferentially continuous flexible bands. The smallest circumference band is concentrically nested within a slightly larger second band and the second band is concentrically nested within a still larger inside circumference of a third and yet larger band, and so on, up to the largest outside band whose exterior surface is the exterior surface of the nest and the smallest inner band has its interior surface in contact with the exterior edge of each of the vanes. The construction is similar to the case of a stranded cable of a specific diameter having a much greater strength than a solid rod of the same diameter. Also, the stranded cable is more flexible without failure than the solid rod. The individual clearances between each of the bands in such a collective nest can be chosen to allow slippage and lubrication from one band to the next. This nested band-to-band clearance results in a greater efficiency at very high operating speed by allowing a nested concentric set of bands to slip in speed from one concentric member to the next, with the inner band rotating at substantially the same speed as the rotor and the outer bands rotating increasingly slower. The material used to make the endless flexible band can be any appropriate metal, but other appropriate materials, such as plastic, fiberglass, carbon fiber, or KEVLAR®, can be used. This construction material range applies whether a single thickness endless band is constructed, or a concentric nesting of two or more bands is used to make a concentric nesting of a number of bands. The description thus far is of a flexible circular and continuous containment band with the band confining all the radial centrifugal forces of vanes and eliminating contemporary problems such as sliding vane friction, the speed-squared frictional dependence, and the rotor speed limitation. The flexible band construction will also allow for the shape manipulation of the circumference of the band so as to permit varying the swept chamber volume as the rotor turns.

Reshaping of the flexible band is necessary to control the swept chamber volume of the pump as the rotor is turning and comprises an array of radially moveable pistons which are at 0°, 90°, 180°, and 270° around a full circle, i.e., at 12 o'clock, 3 o'clock, 6 o'clock, and 9 o'clock of a clock face. Each of the pistons has an appropriate curvature to contact the flexible band external surface in the positions cited. If the 12 o'clock and 6 o'clock pistons are caused to move inward, the fixed circumference of the flexible band tends to cause the 3 o'clock and 9 o'clock pistons to move outward by an equal amount, but the flexible nature of the containment band permits unequal piston motion. The inward or outward movement of the pistons may be driven by individual controlled hydraulic pressure, or the movement can be caused by mechanical means such as a gear and rack, or radially disposed screw drives to each piston. Another type of piston control means would be the joining of an analog type electric servo motor drive to a ball screw mechanism with an encoder position feedback; which arrangement would easily lend itself to digital control. Whatever the method of controlling the movement of the piston, the final purpose is to controllably elliptasize the flexible band from an axial perspective so as to cause the controlled and varying degrees of swept volume of fluid flow per revolution of the vane pump or motor. In the basic embodiment of this invention, opposing pairs of pistons move simultaneously towards or away from each other, while the remaining set of opposed pistons behave in simultaneous opposition to the action of the first pair. This behavior results in varying degrees of elliptic reshaping of the flexible band viewed from the axial perspective of the vane rotor. A novel and significant aspect of this device is the freedom of movement of the flexible band, which is impossible in the prior art. This includes a special manipulation of the pistons and band that allow the combination of this invention to simultaneously manipulate two common fluids, but hydraulically separate, outputs of this device as pump or motor. The variable pressure balanced design has two equal and identical pressure fluid outputs which will be merged so as to drive a hydraulic motor to form what is called a hydrostatic transmission. This is a second embodiment of the present invention. In addition, a second variable vane device of the proposed design may act as a motor in a conventional type of hydrostatic transmission with all of the current results, but with much greater efficiency and range. Another embodiment of the invention is a special piston manipulation that causes this invention to act like the early variable non-pressure balanced construction pumps with a single input and output. In the present invention, there is shown two separate hydraulic circuits with separate inputs and outputs where a single pump of the proposed design is separately connected to two fixed displacements hydraulic motors. Motor Number 1 will connect in closed hydrostatic loop with the first and second quadrant ports of the pump, while motor Number 2 will connect in closed hydrostatic loop to the third and forth quadrants with no interconnection. The plumbing of the motor circuits would be such that both motors would have the correct shaft rotation direction for a hypothetical example, say forward. If the 12 o'clock and 6 o'clock pistons were directed inward, the 3 o'clock and 9 o'clock pistons would be forced outward with equal hydraulic flow to both motors occurring, causing the motors to turn at the same controlled speed in the forward direction. Now assume that the original circular flexible band shape is modified such that the 3 o'clock piston is moved inward and the 9 o'clock piston is moved outward, while holding the 12 o'clock and 6 o'clock pistons at neutral, the band remaining circular in shape. A first motor connected to the first and second quadrants will reverse shaft directions, with a speed equal to that of a second motor whose direction is still forward. If the 3 o'clock and 9 o'clock piston were both moved the other way, the second motor would instead reverse rotation in relation to the first motor. Combine this action with the original action of the basic embodiment as described, and one motor can be caused to rotate deliberately and controllably faster than the other motor, such as is the case for an axle set of a vehicle going around a turn. Another embodiment of the invention has two separate piston control methods which can be algebraically mixed to effect differential control means of axle rotation for negotiating a turning radius. Another embodiment comprises a fixed displacement motor of the prior art constructed in the manner of this invention, with the pistons permanently fixed. This arrangement will be much more efficient than conventional hydraulic motors. A still further embodiment is the case of fixed displacement motors and pumps which can greatly improve the efficiency of existing vane pump and motors; namely that one or several flexible bands of the proposed invention construction can be closely fitted to be movable just inside the fixed elliptic or circular cam ring surface of conventional units, with a small clearance between the flexible ring exterior and the fixed cam ring interior, said clearance supporting an oil film which has minimal friction, while the vane outer edges are now supported by the innermost flexible band's inner surface. This construction provides some of the advantages of the subject invention, such as containment of vane centripetal force, and the replacement of vane-to-fixed cam ring friction with broad oil film friction that is much less, and not speed squared dependent. The primary invention configured as a fixed unit will still be most efficient due to the open chamber between each fixed piston pair. A smaller total oil film in this case will give the least loss. A significant advantage of the just described construction is the ability to fix existing design, or even retrofit field product without any mechanical change required. Existing vane units could compete with fixed piston pumps and motors in terms of efficiency, but would be less efficient than the basic embodiment. This is a fifth embodiment of the invention.

Finally, in yet another aspect of the invention, the hydraulic vane pump with a flexible band control described in U.S. Pat. No. 6,022,201, also known as an hydristor, may be employed in a heat pump system characterized as a hydristor heat pump. The hydristor heat pump preferably contains a closed freon loop containing a first and a second closed half loop, the hydristor being integral to the closed freon loop and in fluid communication therewith. A first half of the hydristor contains at least one kidney port forming a first inlet (e.g., in the fourth quadrant as shown in FIG. 4) and at least one kidney port forming a first outlet (e.g., in the first quadrant as shown in FIG. 4). The first half of the hydristor functions as a pump/compressor as a chamber rotatably communicating with the rotor is volumetrically reduced as it rotates from the fourth quadrant to the first quadrant. The volumetric compression of the chamber in turn compresses the compressible fluid or freon contained therein through the first inlet chamber, and as such results in a heated liquid stream exiting the first outlet into the second closed half loop.

The heated liquid freon stream then enters a second heat exchanger connected inline to the second closed half loop and thereby transfers heat to a cold reservoir such as a home heating system or a Stirling engine. The cooler freon stream exiting the second heat exchanger then continues in the second closed half loop back to a second half of the hydristor.

The second half of the hydristor contains at least one kidney port forming a second inlet (e.g. in the second quadrant as shown in FIG. 4) and at least one kidney port forming a second outlet (e.g. in the third quadrant as shown in FIG. 4). The cooler freon stream enters the second inlet and exits the second half of the hydristor through the second outlet as a cooled and expanded gas freon stream. The second half of the hydristor functions as a motor/expander as the chamber rotatably communicating with the rotor is volumetrically increased as it rotates from the second quadrant to the third quadrant, and to the fourth quadrant as well. The volumetric expansion of the chamber in turn expands the compressible fluid or freon contained therein through the first inlet chamber, and as such results in a rarified gas freon stream exiting the second outlet into the first closed half loop at low pressure and temperature.

The rarified gas freon stream then enters a first heat exchanger connected inline to or integral with the first closed half loop and thereby absorbs heat provided from a relatively warm reservoir such as the ambient air. The warmer rarified gas freon stream then exits the first heat exchanger and continues in the first closed half loop back to the first inlet for completion of a pump cycle. Note that quadrant four also increases volume and therefore creates additional motor torque thereby further reducing power input to the motor. The increased efficiency of the hydristor results in a reduction in the torque required by a startup motor associated with the hydristor heat pump. Furthermore, the increased efficiency of the hydristor actually enables the economic use of a Stirling engine thereby providing the benefits described hereinbelow.

Stated another way, a heat pump system in accordance with the present invention contains a hydristor pump/motor in fluid and thermodynamic communication with a first heat exchanger communicating with a relatively warm reservoir, and a second heat exchanger communicating with a relatively cold reservoir. The hydristor and the first and second heat exchangers are integral to and in fluid communication with a closed compressible fluid loop. A Stirling engine or a home heating system may, for example, utilize heat transferred from the second heat exchanger thereby providing a reduction in energy usage and costs heretofore unrealized Another advantage is that the freon compressor oil circulates in the entire system and will tend to collect at the contact surfaces between the flexible band outer surface and the curved contact areas of the control pistons to form large hydrodynamic bearings that are self-actualizing hydraulic seals and low friction bearings.

BRIEF DESCRIPTION OF DRAWINGS

FIG. 8 shows a simple schematic connection of the basic embodiment of the invention connected in a closed hydraulic loop together with a conventional hydraulic motor.

FIG. 9 shows a schematic connection of a variable pump connected to two fixed displacement hydraulic motors which drive vehicular wheels.

FIG. 14 illustrates another piston drive.

FIG. 15 illustrates a screw control piston drive.

FIG. 16 illustrates a small closed-loop servo system as a piston drive.

FIG. 17 illustrates another piston drive containing an externally controlled cam and cam roller.

FIG. 18 illustrates a plurality of sprockets in a plurality of piston drives.

FIG. 19 illustrates an alternate control linkage means in a plurality of piston drives.

FIG. 20 illustrates a plurality of crowned flat pulleys for simultaneous control of the plurality of pistons.

FIG. 21 illustrates a cam ring drive.

FIG. 25*a*–25*c* illustrates a valve insert slidably engaged within a corresponding groove.

FIG. 26 is a view of a hydristor super heat pump, in accordance with the present invention.

FIG. 27 is a view of the hydristor super heat pump of FIG. 26 providing a heat source to a Stirling Engine.

DETAILED DESCRIPTION OF THE INVENTION

Co-owned U.S. Pat. No. 6,022,201 describes an hydraulic vane pump with a flexible band control. For definitional purposes, the entire description (incorporated herein) refers to a pump and/or motor that may also be referred to as a "hydristor". That description is included in the following discussion. The development of the hydristor has in turn resulted in the development of a super heat pump shown in FIGS. 26 and 27 that before now could not have been operated with the operational efficiencies described below.

Figure 1:
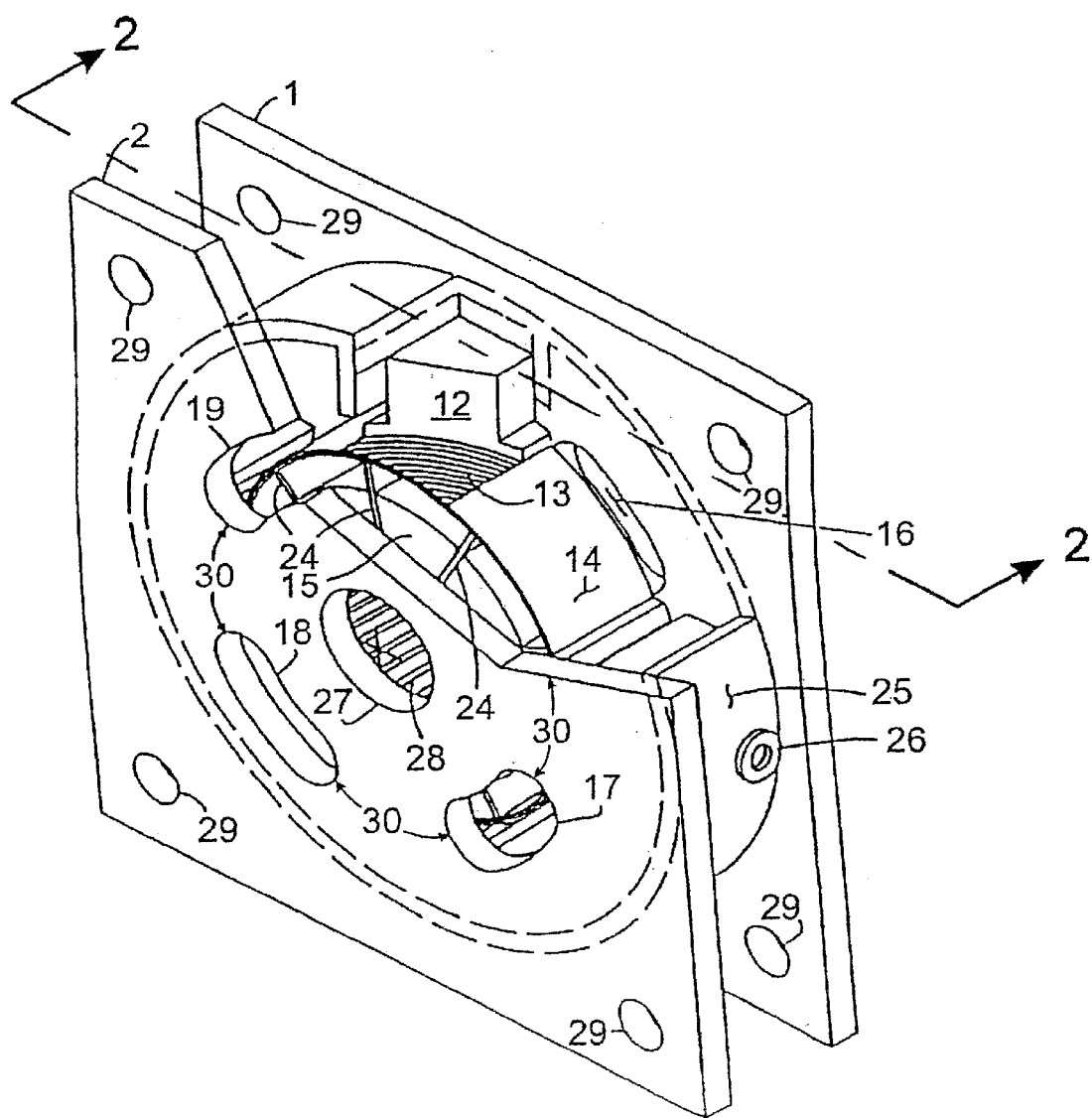
FIG. 1 is an isometric view of the invention with a partial frontal cutaway to expose details of construction.

The isometric view shown in FIG. 1 has a frontal first quadrant cutaway that exposes some very important features of the invention. The rear end plate 1 is shown with the first quadrant kidney port 16 exposed. The front end plate 2 is partially cutaway with the kidney ports 17, 18, and 19 respectively in the second, third and fourth quadrants showing. The rear end plate 1 has like kidney ports 20, 21, and 22 in axial alignment with ports 17, 18, and 19, but those ports in plate 1 are out of view in this drawing. This view shows like kidney ports front and back. However, it is only necessary to have one port per quadrant chamber to allow for fluid flow into and out of the chamber. Either the front or rear ports can be utilized, or both can be used to increase the flow capacity. Also, referring to FIG. 4, any other means of porting which allows fluids to flow into or out of the volume 33, 34, 35, or 36 when they rotate in alignment with "quadrants one, two, three, or four" may be used. Front kidney port 23 is in the cutaway portion of end plate 2, and is in axial alignment with port 16. Piston 12 is exposed and is itself cut away at an angle to expose the high pressure fluid film 13 which exists between the curved inner surface of the piston, and the outer circumferential area of the flexible band nest 14. The piston interface shape as shown is curved; however, any surface shape that supports the fluid film 13 can be used. Each of the four pistons has a fluid film 13. Several vanes 24 are exposed by the cutaways. The outer casting 25 has four piston guides and four control ports 26. The ports 26 direct the inlet and exhaust of fluid control pressure to the four pistons to effect reshaping of flexible band 14. The invention is totally symmetric in hydraulic function and can function interchangeably as a hydraulic motor. The front end plate 2 has a hole 27 in it to permit the insertion of a drive shaft that will couple to the rotor 15 by means of the internal splines 28. The drive shaft is not shown so as to minimize the complexity of the figure. Seals and bearings of conventional design are also left out for the same reason. The shaft requires both a seal and bearing in plates 1 and 2 to facilitate the rotation of the rotor 15, the vanes 24. The four holes 29 in each of plates 1 and 2 would allow for four bolts which would tightly hold both of the end plates against the outer casting 25; however, any appropriate number of bolts may be used, and any other means of construction which hydraulically contains the rotor 15, vanes 24, band 14, and shape control means such as the pistons 12, 3, 6, and 9 may also be used.

Figure 2:
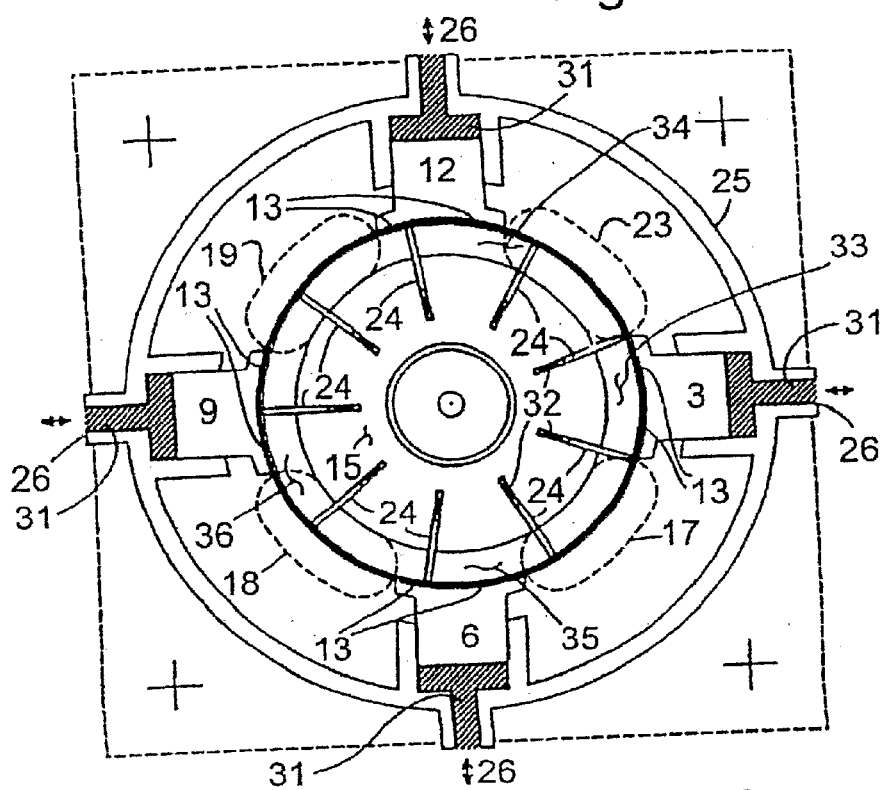
FIG. 2 is an axial view of plane 2—2 of FIG. 1 that shows piston, flexible band, rotor, vanes, and kidney ports.
Figure 3:
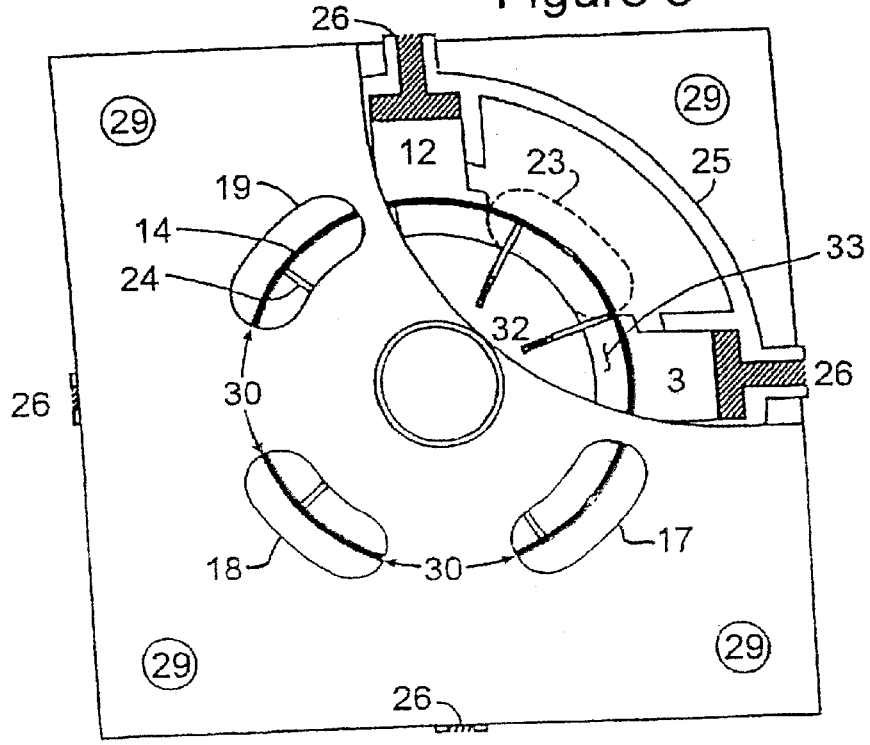
FIG. 3 shows the front plate with kidney ports, with the first quadrant cutaway as in FIG. 1.
Figure 11:
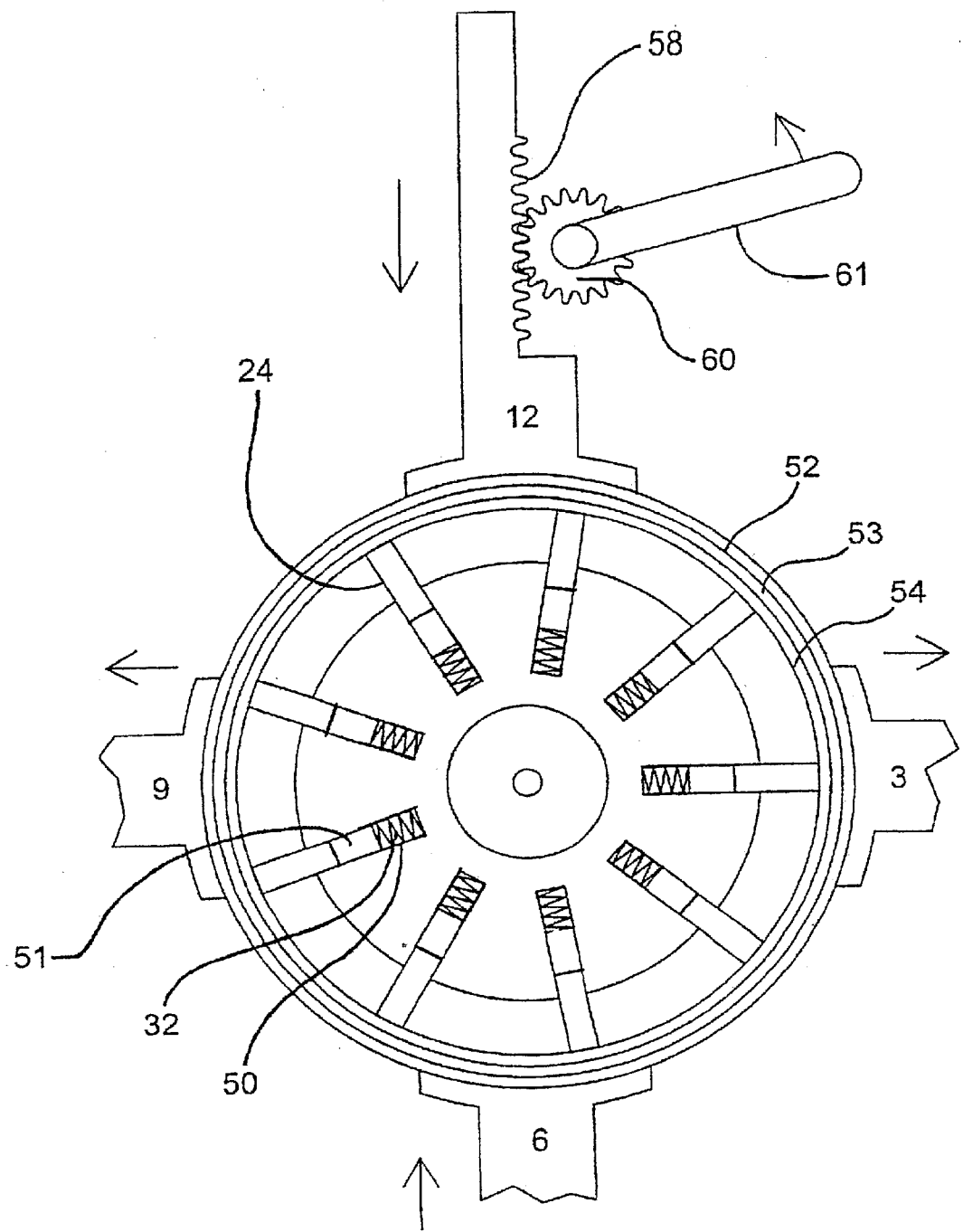
FIG. 11 is a view showing the multilayer flexible band nests and rack and pinion piston drive.

FIG. 2 shows an axial end view of the invention with the end plates removed, and with dotted outlines of end plate 2 with ports 17, 18, 19, and 23 outlined. The four control pistons numbered 12, 3, 6, and 9 are now shown. Shaded areas 31 are filled or exhausted by the control ports 26 to allow control fluid into and out of the chamber 31 behind the four pistons 12, 3, 6 and 9. As shown in FIG. 11, the flexible band 14 may have three concentric members 52, 53, and 54. These bands are preferably of stainless steel, each having a thickness in the order of 0.015 inches. The actual number and thickness of bands to be utilized will be determined by the design requirements. Also, as shown in FIG. 11, each vane 24 has compression springs 32 mounted in rotor 15 that force the vane out from the center of the rotor 15 into contact with the inner surface of the band 14. Three springs and bores are provided for mating with three pins 51 on each vane with the pins being equally spaced along the base of the vane. Such band and spring combinations are found in U.S. Pat. No. 4,325,215 which is incorporated by reference herein. This action assures that the vanes will seal fluid pressure at zero speed. It is a very important feature of this invention that the rotor 15, all the vanes 24, and the flexible band 14 will rotate as a group. At very slow speeds, the band will slip very slightly with regards to the vane speed, much like a squirrel cage a/c induction motor rotor will slip behind the field rotation speed. This slow drift is the result of fluid shear drag caused by the four fluid films 13, which act so as to slow down the flexible band 14 speed. This drag force is counteracted by the combined line contact friction of, in this example, nine vanes. The vane friction is much greater than the fluid film friction, and the vane friction increases as the speed squared. Thus, as the speed of rotation increases, the flexible band will begin to rotate as substantially the same speed as the rotor. Since the vane and band speed never quite equalize, the wear on the inner surface of the flexible band is evenly distributed over the entire inner band surface, and the maximum wear life is achieved. Since the centrifugal, speed squared forces are totally contained by the flexible band, the wear and failure mechanism of high-speed vane type pumps and motors is eliminated. The added friction of four fluid contact areas 13 is small compared to the combined vane friction, and does not increase significantly with higher speed. The result is a device which is much more efficient than any conventional design and which will operate efficiently at much higher speeds. These factors also allow for quieter operation at higher operating pressure. In FIG. 3, areas of the end plate 2 are marked 30 with identical areas axially in line therewith on end plate 1. A radial wedge shaped chamber 33 is shown directly under piston 3. Referring to FIG. 2, the front and back aligned areas 30 completely cover the axial ends of the chamber 33. Fluid pressure in quadrants one is prevented from directly flowing into quadrants two, and vice versa. If the rotation of the rotor is clockwise, the volume of chamber 33 will move from quadrant one to quadrant two in one ninth of a revolution. Since the chamber 33 is now closed on both ends by the presence of solid area 30, the volume of chamber 33 which was part of the first quadrant chamber volume is now forced into the second quadrant chamber. Simultaneously, 34 rotated from the fourth quadrant chamber into the first quadrant chamber. If the flexible band is formed to a circle, then volume 33 is equal to volume 34, and there is no gain or loss of fluid volume in any of the four quadrant chambers. This is true regardless of speed or direction. If ports 18 and 23 were connected to the inlet port of a separate fixed displacement hydraulic motor, and the motor's return port was connected to device ports 17 and 19, the shape of the flexible band would be called neutral because the pump would not move any fluid into or out of the motor, and the motor shaft would not turn since a fixed displacement of fluid must occur in order for the motor to turn. If ports 23 and 17 were connected to one fixed displacement motor, and ports 18 and 19 were connected to another such motor, the result would be exactly the same. In either case, the input shaft of the variable pump would continue to turn with no motion ever on a motor shaft.

Figure 4:
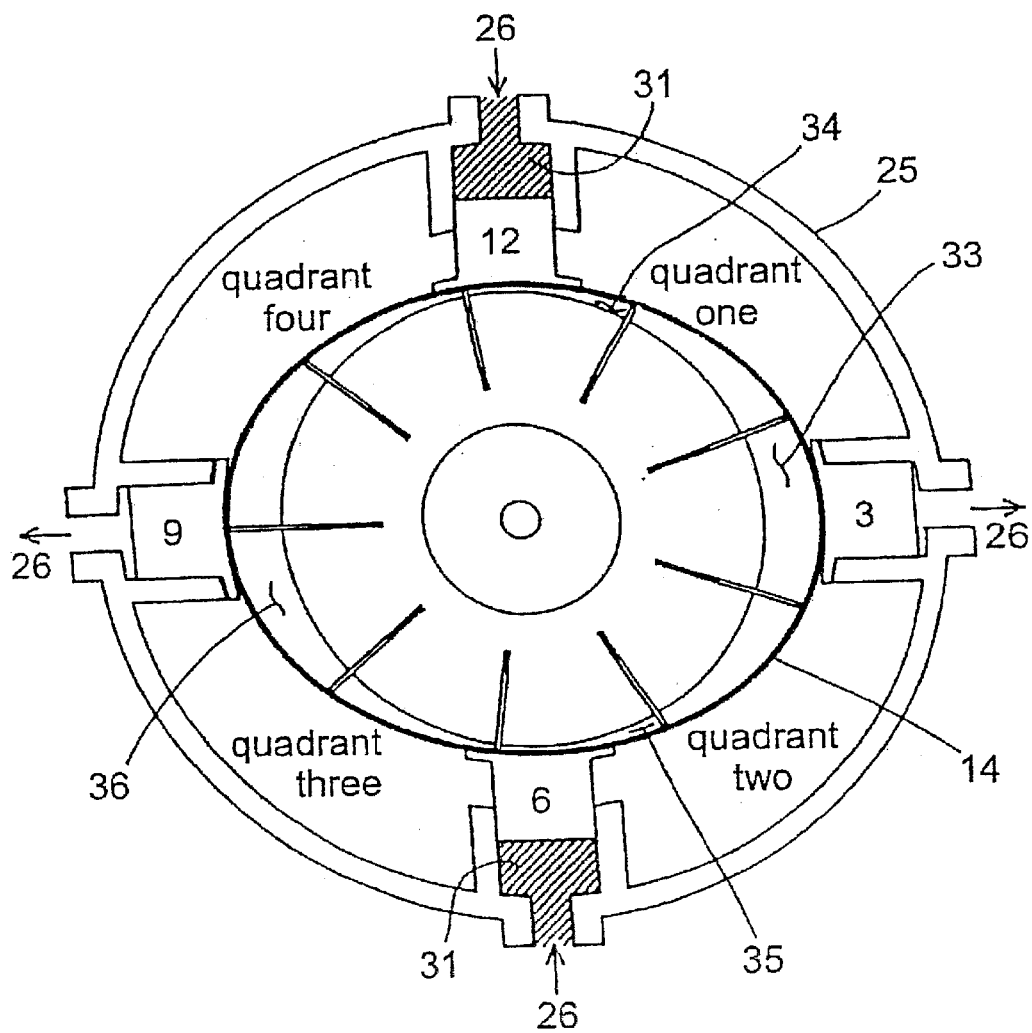
FIG. 4 depicts control pressure being applied to the 12 o'clock and 6 o'clock pistons, causing an elliptical reshaping of the flexible band.

In FIG. 4, control pressure is injected into the control ports 26 for pistons 12 and 6 causing them to move radially inward. Any other mechanical means of control, such as rack 58 and pinion 60 activated by lever 61 as shown in FIG. 11, would act in a similar manner to the pressure and cause pistons 12 and 6 to move radially inward due to external mechanical force. The spring action of the flexible band causes it to bulge out in equal measure against the pistons 3 and 9, while causing those pistons to move radially outward while exhausting the control fluids volume out through control ports 26. The use of mechanical control here would require that the mechanical controls means would retract to allow for the spring action of the band 14 to push pistons 3 and 9 outward. The arrows at the control ports 26 show the direction of fluid flow. Now for this discussion, a clockwise rotation is chosen. FIG. 4 also shows maximum deflection of the flexible band 14. Rotating vane chambers 34 and 35 are shown as minimized, while the chamber 33 and 36 are maximized. Since chamber 33 is removing a much larger volume of fluid from the first quadrant than the chamber 34 is carrying in, the difference must be provided via either kidney ports 23 or 16. Therefore, ports 23 or 16 are suction ports that can be connected to an external hydraulic circuit, and fluid is drawn into "quadrant one" through those ports. Chamber 33 is very large when it rotates into the second quadrants, and chamber 35 now is very small in exiting. The large difference of the volumes must therefore be forced out kidney ports 17 or 20 into the external hydraulic path. Ports 23 and 16, and 17 and 20 form a hydrostatic loop when connected to an external fixed displacement hydraulic motor. For reference, look at schematic connection in FIG. 9. By varying the radial positions of the pistons 12, 3, 6, and 9, the fluid displaced can be fully controlled from zero to the maximum in any increment. Now, ports 18 and 21, and 19 and 22 will form a second Siamese hydrostatic loop when they are connected to a second external hydraulic motor. For like displacements of the pistons 12 and 6, and opposite and equal motion of pistons 3 and 9, the fluid flow through fluid circuit A which consists of ports 23 and 16, and 17 and 20 will exactly equal the flow through fluid circuit consisting of ports 18 and 21, and 19 and 22. This described the case of straight motion for a set of vehicle axles. The simple case of ports 23 and 16 paired with 18 and 21, and 17 and 30 with 19 and 22, and then connected to a single fixed or variable hydraulic motor is also straight-line motion. For Reference, look at the fluid connection shown in FIG. 8. As the rotor, vane, and flexing band assembly rotate, the action of the elliptasized band will be to force the compression and extension of the vanes 24, with regard to angular position only. The pressure being applied to pistons 12 and 6 through ports 26 causes the pistons to move inward. For the clockwise rotation, output hydraulic pressure will escalate in the second and fourth quadrant chambers. As the chamber pressure increases, an increasing radial outward force develops on the underside of pistons 12 and 6, thereby reducing the respective piston inward force. When the outward force is equal to the inward force, the piston inward motion ceases. As the external hydraulic motor circuit responds to pressure and turns, the developed pressure drops slightly, and allows the pistons 12 and 6 to move slightly more inward, and this in turn increases the volume of fluid passing through the variable pump, in turn causing the motor to turn faster, thus causing a further line drop, causing more piston motion in, and so on. Therefore, the pressure developed in the quadrant chambers is equal to, or in proportion to the control force, and the variable pump automatically changes its displacement to accommodate changing external flow, while holding the out pressure proportional to the control pressure. Thus the hydraulic motor torque is a function of control pressure regardless of variable pump input speed and direction and output motor speed.

Figure 5:
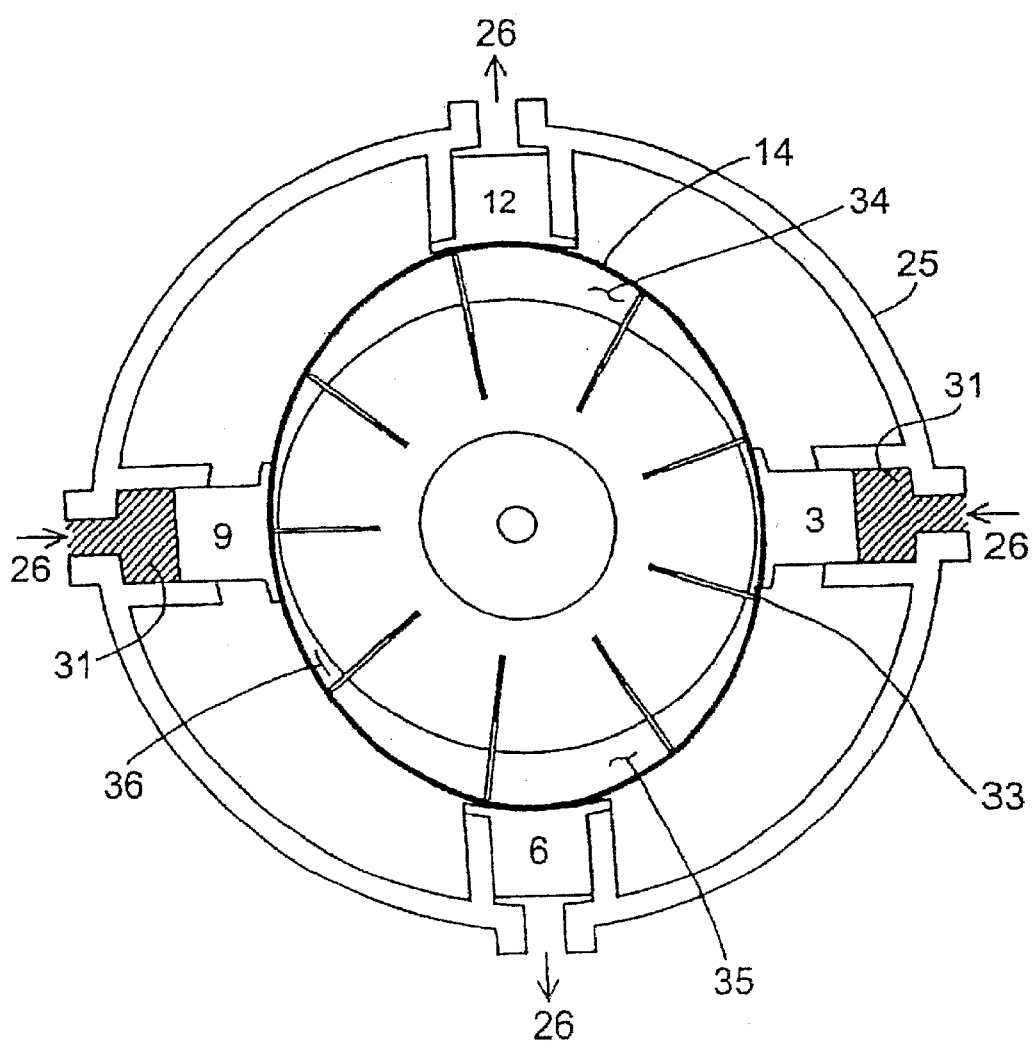
FIG. 5 depicts control pressure being applied to the opposite set of pistons with opposite reshaping behavior.

FIG. 5 depicts the opposite case of piston operation in that pistons 3 and 9 are pressurized, causing them to move radially inward. Pistons 12 and 6 are forced out and the ellipse flexible band major axis is now vertical. Swept chamber volume 34 now is large, as is volume 35, while volumes 33 and 36 are now small. There is now an excess of fluid entering the first and third quadrant chambers and kidney ports 23 and 16, and 18 and 21 become pressure ports, while a shortage of fluid in the second and fourth quadrants results in kidney ports 17 and 20, and 19 and 22 becoming suction ports and the hydraulic motor would now reverse direction. Note that in the case of FIGS. 4 and 5, if the shaft rotation of the pump input were reversed, the external fluid direction would also reverse and the manipulation of the opposed sets of control pistons, both the volume and direction of the fluid output can be fully controlled. Also note that by pressurizing the opposite sets of pistons to the pair shown in FIGS. 4 and 5, the subject pump can be used as a variable hydraulic motor. This is an ideal component for interface between an energy storage flywheel and road wheels. The device as a pump can also interface to a flywheel or electric motor including a pancake design motor and can act to use or recover flywheel or motor energy directly. During acceleration, the pump will withdraw the pre-stored kinetic energy from the flywheel and direct it to the road wheels so as to accelerate a vehicle. During braking, the opposite pistons try to force the flexible band back into a circular shape and in so doing, cause the pump to behave like a motor which then will act to re-accelerate the flywheel to near its initial speed. During the braking action, straight-line vehicle energy is recycled back into the flywheel and the vehicle is brought to a standstill. The braking action is the same for either a single output motor or two motors.

Figure 6:
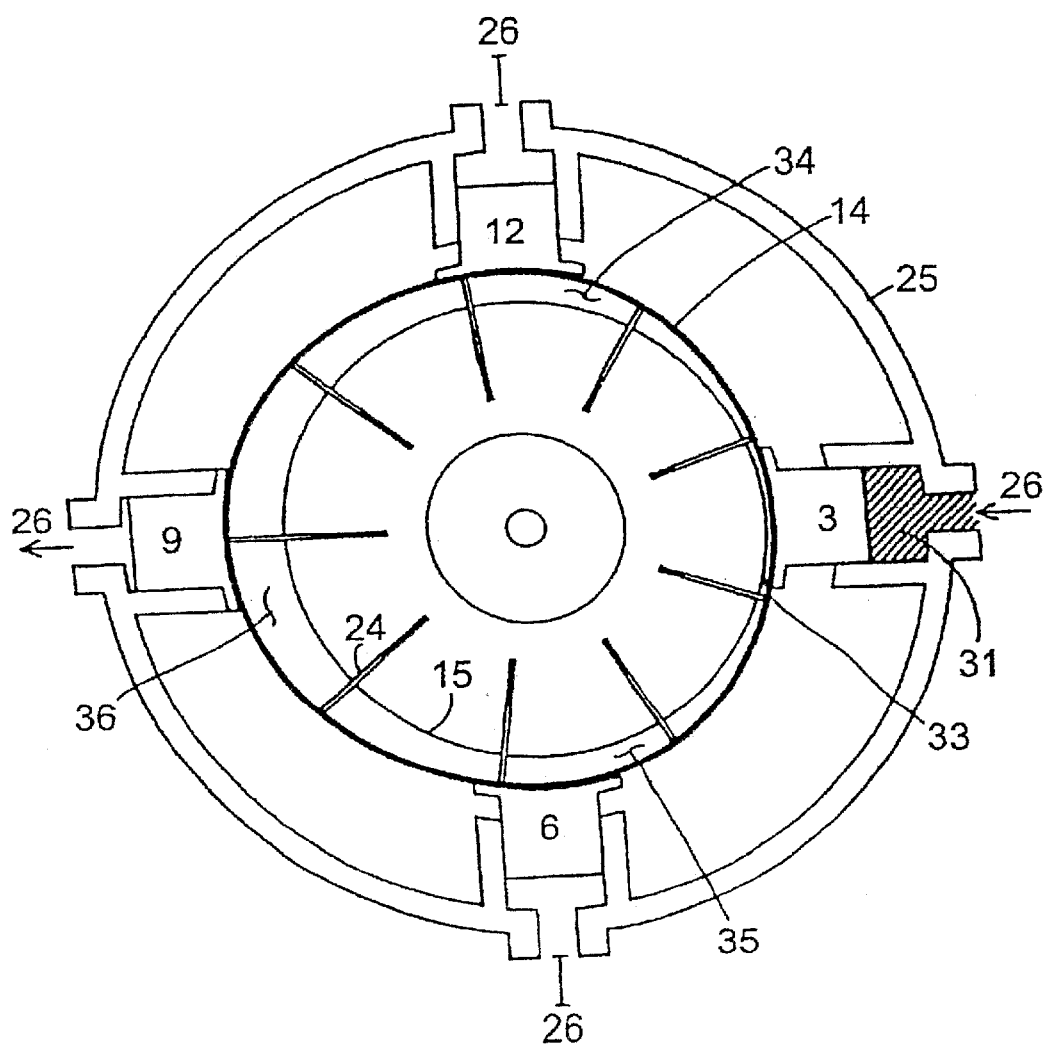
FIG. 6 shows the differential behavior of the invention caused by moving the 3 o'clock and 9 o'clock pistons in the same direction.
Figure 7:
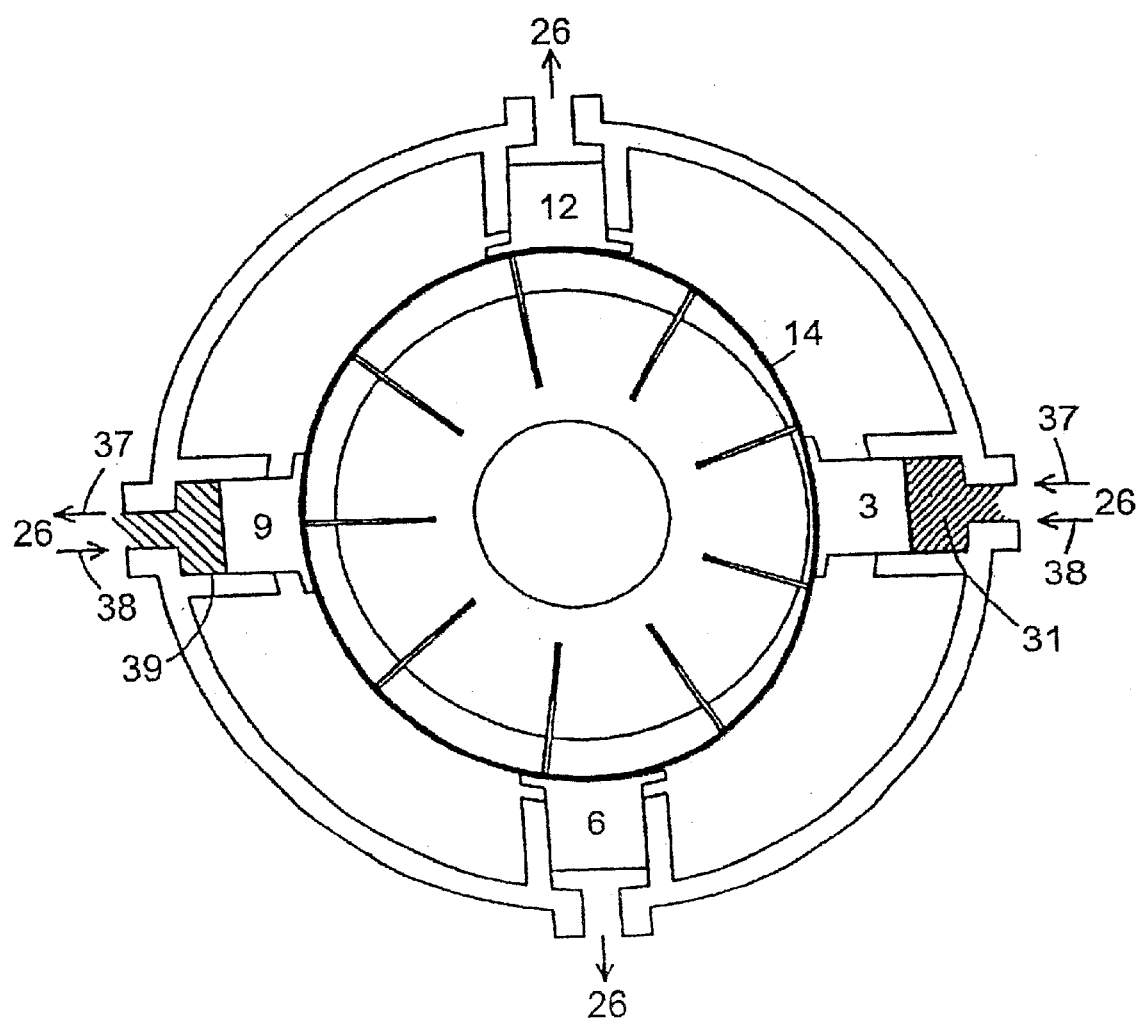
FIG. 7 shows the differential-sum behavior of the invention when more control pressure flow volume is directed to the 3 o'clock control port than is directed to the 9 o'clock port.

FIG. 6 shows control pressure being injected into port 26 causing piston 3 to move inward. Control fluid flows from port 26 of piston 9, and the entire flexible band moves toward piston 9 while maintaining a circular shape. Rotating chambers 34 and 33 behave as in FIG. 5 although with lesser amounts of fluid displacement per revolution. However, if a second motor is connected to ports 18 and 19, as shown in FIG. 9, it would experience a reversal of direction because chamber 36 is now larger than chamber 35, while at the same time, chamber 36 is larger than chamber 34. The third quadrant becomes suction while the fourth quadrant becomes the pressure. This is the behavior of some industrial skid-steer loaders that reverse the rotation of the wheels on one side of the vehicle with respect to the other side, causing the vehicle to spin on its vertical axis. If piston 9 were pressurized instead 3, both fluid circuits would reverse, and the two motors would now spin in opposite directions which are both reverse according to the original directions. During all of the above behavior, note that the control ports 26 of pistons 12 and 6 were quiescent with no inward or outward motion of these pistons. Also, during this differential action, a pressure balance within the pump is no longer maintained, and such differential action should be limited in duration and power level so as to minimize shaft bearing load and therefore maximize pump life. FIG. 7 combines the differential control action with the normal displacement control to achieve special unequal flow to the motors for the purpose of driving two wheels unequally, but correctly around a turn, since the outside wheel rotates faster than the inside wheel. Further, the amount of differential action can be directly related to the correct wheel track in response to a steering input. Thus, a very unique control mechanism is obtained for driving both wheels in turns and this will greatly enhance vehicle traction and safety. In this case, differential control pressure 37 is applied to ports 26 of pistons 3 and 9, while normal control pressure 38 now is simultaneously applied to those same ports. The resultant control pressure 39 and volume obtain at piston 9 may be different from the control pressure and volume obtained 31 applied to piston 3. The result is the combination of circular displacement of the flexible band 14 with reshaping of the band at the same time. The result is a different but controlled speed of one more with respect to a second, as shown in FIG. 9 resulting in a differential two-wheel drive. The differential portion of the control can be derived from the steering system, while the go and stop motion can be derived from brake and acceleration pedals. FIG. 8 shows the variable pump connected to either a fixed displacement hydraulic motor or another variable pump that is used as the motor to form a hydrostatic transmission. The conventional hydraulic motor case is limited to the range of one-to-one and one-to-infinity, where the use of a second variable unit extends the range to infinity to one.

FIG. 9 shows the schematic connection of one variable device to two fixed hydraulic motors, utilizing the Siamese ports of the invention to drive two separate outputs. This connection will allow the differential feature of the invention to be in use to differentially drive the two motors so as to effect a differential drive to the motor outputs, which is the case in a vehicular axle set negotiating a turn.

Figure 10:
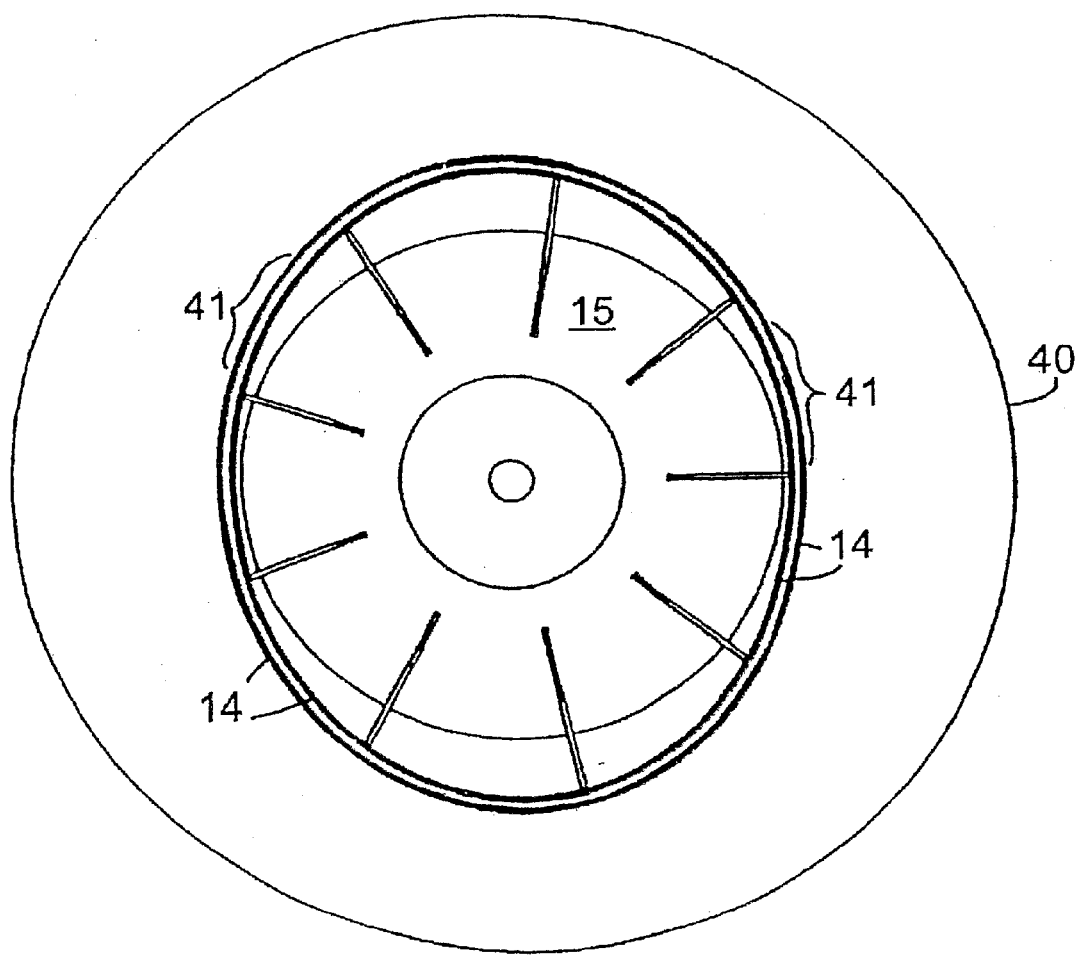
FIG. 10 shows the addition of a flexible band to a conventional fixed displacement vane unit pump or motor with a fixed internal cam ring.

FIG. 10 shows the installation of a flexible band 14 in a conventional vane pump. The vanes 24 and rotor 15 are of conventional construction, like the proposed invention. The outer housing 40 is of conventional manufacture and chamber design, and the oil film 41 separates the band 14 from the outer housing 40 which will reduce operating friction in conventional units. The oil film 41 in this case is the full length of the ground internal chamber of the conventional outer housing. The sliding friction of the set of vanes is eliminated, and replaced by a broad oil film 41 of lesser friction; and, the efficiency of the conventional vane pump or motor is improved. Fixing the piston arrangement shown in FIGS. 4 through 7 will result in a fixed displacement pump or motor, whose efficiency will be the highest of all due to a reduced oil film 41 area.

For referential purposes, all radial orientation described hereinbelow is with respect to the axial center of a rotor in accordance with the present invention, unless otherwise stated. Stated another way, "radial" in this context means to emanate to and from the axial center of the cylindrical rotor, unless otherwise stated.

Figure 12A:
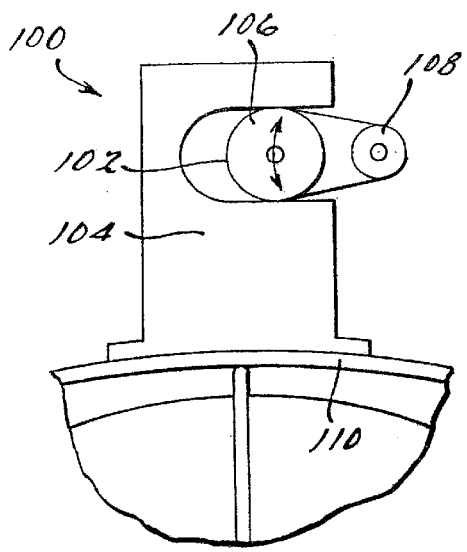
FIG. 12*a* illustrates a crankshaft piston drive.
Figure 12B:
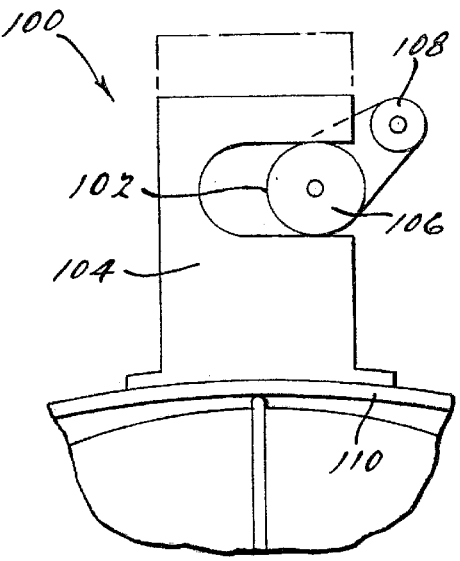
FIG. 12*b* illustrates a crankshaft piston drive.
Figure 12C:
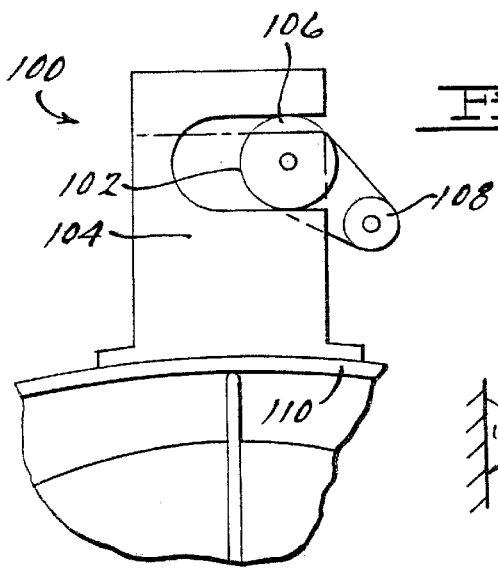
FIG. 12*c* illustrates a piston crankshaft drive.

FIGS. 12a–12c are views showing a crankshaft piston drive 100 utilizing a right angle slot 102 in the piston 104 relative to the length and motion of the piston. As shown in FIGS. 12a–12c, when the crankshaft 106 is rotated counter clockwise relative to the crankshaft rotational center 108 shown, the piston moves from a neutral position to a position radially inward. Thus, the crankshaft exerts a radially inward movement thereby forming a flush communication between a contoured and curved end of the piston and the flexible band 110, depressing the band radially inward. Conversely, when the crankshaft is rotated clockwise of the crankshaft rotational center, the piston retracts radially outward from the flexible band, and the spring action of the band causes it to follow the piston.

Stated another way, in the embodiment shown in FIGS. 12a–12c, a control crankshaft operates in a right angle slot in the piston. The crankshaft throw is typically positioned at a right angle to the direction of piston travel, and is rotated plus or minus 90 degrees to cause a sinusoidal motion of the piston thereby resulting in a radially reciprocal (radially inward and then radially outward) motion of the piston. Thus, the linear and radial reciprocal motion of the piston corresponds to a sine wave responsive to each degree of crankshaft rotation. The spring like nature of the band causes it to remain in intimate contact with the piston surface via a thin oil film, thus forming a hydrodynamic bearing from the oil film.

Figure 13:
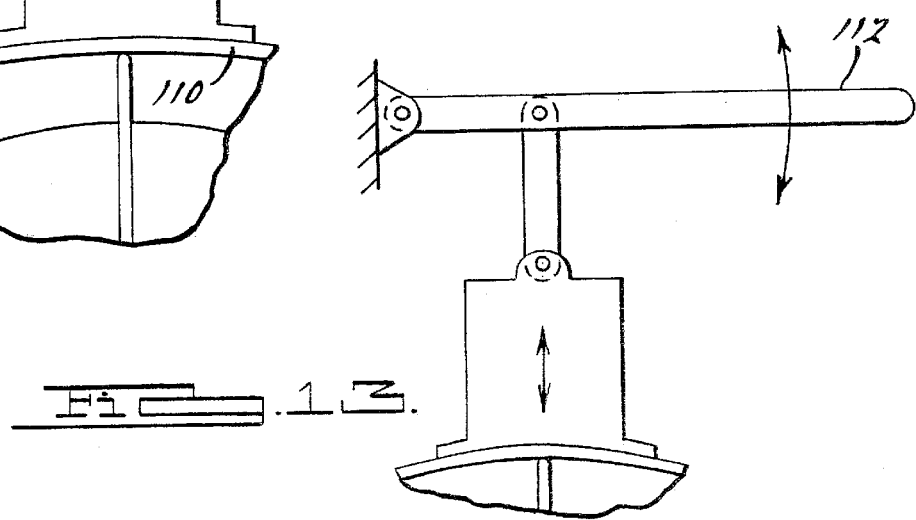
FIG. 13 illustrates a lever piston drive.

In FIG. 13, yet another piston actuator is shown wherein a lever is externally controlled to effect respective radially inward and outward motions of the piston. The lever can thus be controlled by any connection that provides a common manipulation of the plurality of pistons (or shape actuators of the flexible band) shown in the Figures, or the lever can be individually controlled. For example, simple manipulation of a foot pedal (an accelerometer for example) can effect manual control of the piston through the use of the lever.

FIG. 14 generally depicts the forces acting on a given piston. A steady state control pressure is radially inwardly applied to a radially outward cross-sectional area of the piston. During operation, as the work pressure increases below the flexible band, it exerts a radially outward force acting upon a radially inward contoured section of the piston. As the work pressure increases and decreases, therefore, the piston is cycled radially outward and radially inward.

Stated another way, FIG. 14 illustrates that relative to direct hydraulic piston control, an area radially outward of the piston is subject to a controlled hydraulic pressure which causes the piston to move radially inward. This action causes the pump to develop a greater work pressure by virtue of the fact that radially inward movement of the piston causes increased displacement output of the pump. This in turn causes the working pressure to rise. When the work pressure has reaches a value which balances the net force created on the piston by the control pressure, the piston inward motion ceases, providing a servo-type of control function wherein the pump working pressure tracks the control pressure. Thus, this type of control system forms a power amplifier where the output pressure of the pump tracks the control pressure with the result that the control pressure controls the power output linearly. This same operating principle is exhibited by the embodiment shown in FIG. 16, as described below.

In FIG. 15, yet another piston actuator is shown containing a control screw 114 threadedly received in an axial bore 116 of the piston 104. The control screw is thus rotatable to advance or retard piston position. The control is linearly related in that the degree of screw rotation is directly related to the cyclic and radial piston motion. Given the screw's inherent design inhibition for radially outward retraction of the piston, this type of piston actuator is particularly useful in preventing feedback (and an applied torque to an associated actuator) due to applied torque or work performance spikes. For example, the standard jarring caused during tractor operation may result in an associated pressure spike within the rotor that is then transmitted through the piston and into the actuator. Therefore, the resultant torque absorbed by other types of actuators, a rack and pinion for example, could potentially fracture the actuator assembly. The retraction inhibition of this embodiment is one solution to this problem. Nevertheless, a ball-screw control means may be used to reduce the friction of the control screw if desired.

In accordance with yet another aspect of the invention, FIG. 16 depicts yet another piston actuator that can be described as a small closed-loop servo system. A piston spool housing 118 is formed as an axial bore within the piston 104. A plurality of radially extending passages, relative to the axial bore of the piston, facilitate injection and exhaust of fluidic pressure within the piston spool housing. A spool 120 having a plurality of turns 122 (two as shown) is slidably received within the piston spool housing.

As shown in FIG. 16, the spool and piston are shown in a balanced position. Stated another way, the control pressure force exerting a radially inward force on the piston and the opposing working pressure exerting a radially outward force on the piston are substantially equivalent wherein the spool exhibits an equilibrium position relative thereto. In operation, assume the spool is forced radially inward into the piston housing. A fixed control pressure is then injected through passage 124 given that the turn blocking the passage has been thrust radially inward thereby opening passage 124. The control pressure then flows radially outward through passage 126 in fluid communication with the pressure chamber 125 behind the piston 104. As a consequence, the control pressure increases the radially inward force applied to the radially outward cross-section of the piston (within the control pressure chamber) thereby biasing the piston radially inward. As this occurs, the working pressure against the piston (pump output) increases, and the relative position of the spool is returned to a neutral balance as the physical position of the piston moves to realign with the new neutral spool position.

If the working pressure overcomes the applied piston control pressure, the spool is retracted radially outward through the piston spool housing by virtue of the physical movement of the piston body relative to the existing spool position, thereby opening passages 128 and 130 and thus enabling exhaust of the control pressure and effectively reducing the associated piston control force. The reduction in the control pressure force results in the working pressure biasing the piston radially outward thereby reducing pump displacement and the localized working pressure. The reduction of working pressure continues until the working pressure is reduced to a point less than the remaining control pressure (and the spring energy exerted by a spring locator (not shown) on the radially outwardmost end of the spool) within the control pressure chamber. The piston thus "tracks" the piston control pressure and again seeks the balanced position of the spool as described above. The valving arrangement results in low requirements of the force applied to the spool compared to the piston reaction force, or, the working force applied against the piston. Thus, the force requirement on the spool for control is minimized by means of the secondary power servo spool system described.

Stated another way, the system described in FIG. 16 is a hydraulic control amplifier spool means useful in applications where the working pressure forces exerted on the piston(s) are relatively very high. A secondary dedicated spool amplifier may be employed thus permitting a greatly reduced control force requirement, and thereby facilitating the control of very large levels of power with a small control force. A transistor analogue would be the Darlington amplifier. Relative thereto, the control means described in FIG. 16 may also be referred to as a "Darlington Power Amplifier".

FIG. 17 shows yet another piston actuator containing an externally controlled cam 132 and a cam roller 134. The cam roller is fixed to a radially outward portion of the piston. The cam profile 132 is slidably engaged with the roller in linear motion thereto, and thus effects a radial reciprocal movement of the piston 104. The cam motion can be linear as shown, or the cam motion can be circular around the pump rotor center. Related thereto, FIG. 21 shows a circular cam ring 135 containing four cam profiles 136 each cam corresponding to a piston within the four-piston model shown. In motion, the cam ring thus facilitates common and simultaneous control of all four pistons wherein the cam profiles may all be the same or different, and may be linear and/or nonlinear.

FIGS. 18–20 each also illustrate a control linkage means for facilitating common and simultaneous operation or control of a plurality of pistons. A "pump center of rotation" is defined for each control linkage and is merely the axial center of the rotor and pump (not shown). Thus, each control linkage surrounds a rotor/pump as shown in FIGS. 1–11 for example.

FIG. 18 shows a plurality of sprockets 138 (four) corresponding to an equal plurality of pistons (not all shown) and associated crankshafts (not all shown). Each sprocket rotatably communicates with a respective crankshaft that upon revolution results in radial reciprocation of the respective piston. An externally driven chain 140 results in simultaneous rotary motion of the sprockets.

FIG. 19 shows an alternative control linkage means that again contains a plurality of gears 142, a corresponding plurality of crankshafts, and a corresponding plurality of pistons. In concert therewith, an externally driven ring gear 144, radially external or internal of the plurality of gears, facilitates a common and simultaneous control of the pistons. The ring gear is formed with a plurality of sets of teeth symmetrically spaced about the circumference of the ring, each set of teeth corresponding to a piston. In the embodiment shown, the teeth are formed at the 12, 3, 6, and 9 O'clock positions. In operation, the sets of teeth of the ring gear engage the teeth of a respective sprocket or gear thereby throwing the crankshaft and facilitating radial movement of the associated piston.

The embodiment of FIG. 20 operates very similarly to FIGS. 18 and 19. However, FIG. 20 employs a plurality of crowned flat pulleys 146 or gears (again corresponding to an equal number of pistons and crankshafts) driven by a belt 148 for simultaneous control of the plurality of pistons.

Figure 22A:
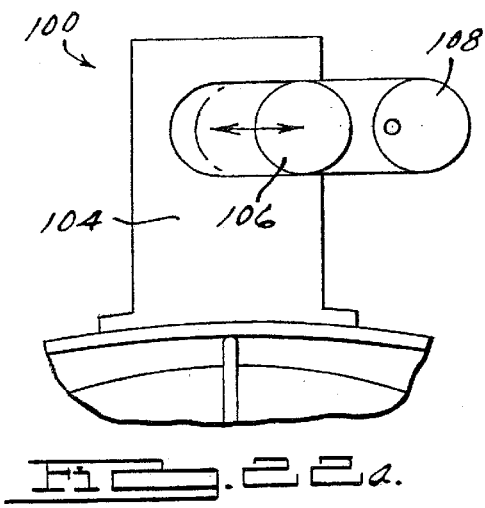
FIGS. 22*a*–22*c* illustrates that the strike cam be changed when the piston is in the neutral position without causing any change in the piston position.
Figure 22B:
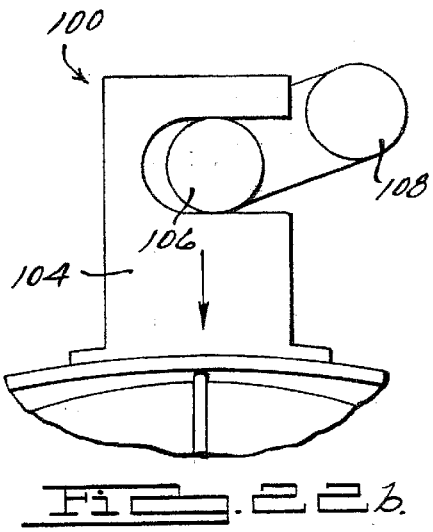
Figure 22C:
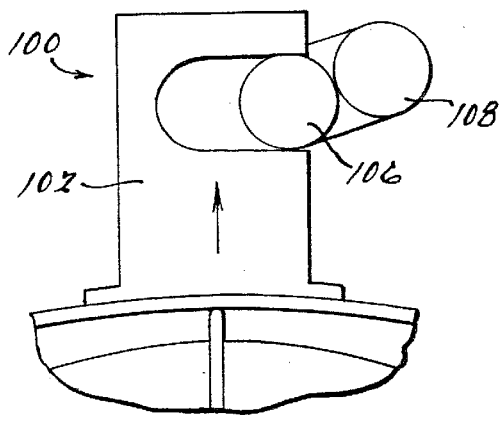

Relative to FIG. 22, a differential gear set with independent control inputs can be added to pistons at the 3 and 9 O'Clock positions in the embodiment shown in FIG. 7, for example, thereby facilitating differential behavior of a vehicle per operation of a rotor as shown in FIG. 7. In certain cases relative to vehicle operation, for example, it is undesirable to allow the differential input to cause opposite wheel rotation. For example, if the differential gear control were connected to a tractor steering wheel without any relation to the forward or reverse speed setting, the tractor would stand still and turning the steering wheel would cause one wheel to back up, while the other would drive forward with the result that the wheels would chew up the surface and dig two holes for the drive wheels. This is of course unacceptable. A solution has been discovered whereby a third axial control system for the 3 O'clock and 9 O'clock crankshafts is introduced. In neutral position (stopped), the crankshafts are at 90 degrees to the piston direction (See FIG. 12a). The solution is to vary the actual stroke of the crankshaft by means of an axial ramp system which is able to vary the stroke in response to an axial (with respect to the crankshaft) control input motion. As shown in FIGS. 22a–22c, the stroke can be changed when the piston is in the neutral position without causing any change in the piston position. If the crank were at perhaps 30 degrees of control rotation, increasing or decreasing the stroke would as shown affect the piston position. If the 3 O'clock stroke was increased while the 9 O'clock stroke was decreased by the same amount, the effect would be to create a shift in the flexible belt position, causing a differential behavior, while allowing the speed control portion of the control to ellipticize the belt, causing perhaps forward motion. The result is a mathematical addition of flows on one side of the rotor, and a mathematical subtraction of flows on the other side of the rotor, and a true differential drive system results.

If the speed were increased, the crankshaft control angle would increase, but the variable crankshaft strokes would have same mathematical effect on the combined differential/speed behavior, and the drive wheels would again be mathematically corrected to turn at the correct, yet faster rate for the turn. The same principles apply for the reverse direction. A separate control input can be accomplished to only cause differential behavior. This is only applicable for a four-wheel drive unit. This can be accomplished by connecting a properly sized hydraulic wheel motor for, perhaps the left front wheel tire (sized to reflect the smaller tire diameter of that front tire) in hydraulic series with the left rear wheel (larger) motor with the result that the hydraulic pressure forced through the left hydraulic circuit is shared by the two motors, and their speeds are locked in synchronicity; a series non-slip system. The same system can be used for the right side with similar results. In normal four-wheel drive, the four wheels are driven at the correct rate in terms of the tire patches on the ground, and the effect is as if all axles were locked for straight-line travel, with maximum traction, even though the vehicle is turning. This system results in giving the maximum traction under all ground conditions, and is thought to be a form of analog hydraulic computer which calculates, using the laws of geometry, the correct hydraulic behavior in response to control inputs.

Figure 23A:
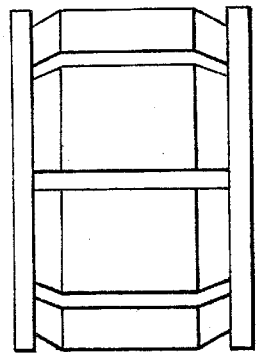
FIGS. 23*a* and 23*b* describe a spool rotor having spool ends that are then mated respectively to wear plates known in the art.
Figure 23B:
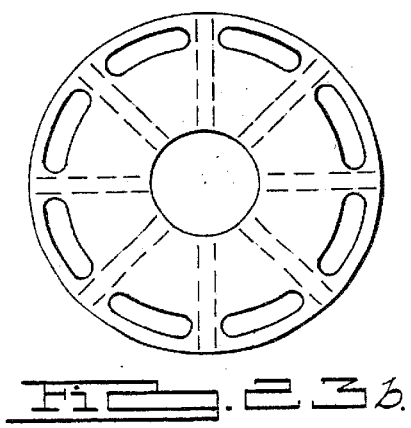

In accordance with yet another aspect of the present invention, FIGS. 23a and 23b describe a spool rotor having spool ends that are then mated respectively to wear plates known in the art. See U.S. Pat. No. 6,022,201 for example. The spool ends eliminate the wear pattern normally caused by the flexible belt as the edges of the belt abrade the inner surfaces of the wear plates adjacent each respective spool end. The use of the spool thus eliminates the effective motion between the edges of the vanes extending from the axis to the flexible belt and the stationary wear plates. The spool ends are instead in rotary communication with the stationary wear plates. As a result, the vanes can be individually sealed along their individual radial lengths and along the interface between an inner surface of the spool end and the radial lengths of the vanes. Additionally, a flexible o-ring or seal may be place between belt and the radial outer edges of the vanes in communication with the flexible belt that is then flexibly adjusted during rotation to retain a seal between the radial outer edges of the vanes and the inner surface of the rotational flexible belt, along the radial edges, and even at the interface where the vanes enter the rotor slots (i.e. all four vane edge interfaces). Accordingly, employment of the spool ends substantially improves the volumetric and overall efficiency of the pump. For example, in certain cases the volumetric efficiency is improved from 85% to 97% or greater.

Stated another way, in conventional designs, the vanes and the rotor are axially coextensive and fit within wear plates at both ends with a small clearance. This small clearance causes substantial volumetric inefficiency, or bypass of pumped fluid. Also, the radially outer edges of the vanes have a leakage contribution in conventional designs where the vanes slide at speed against the inner surface of the chamber to create the pumping action. U.S. Pat. No. 6,022,201 substantially solved the problem of radial leakage by providing vanes having intimate contact within the inner surface of the belt. Conventionally, the axial ends of the vanes slide at rotor speed against the wear plates making effective sealing impossible. The spool design of the present invention therefore solves several problems. It eliminates the high speed wear at the ends by containing the vanes wholly within the spool ends, so that the only wear on the vanes is relative to the cyclical radial motion of the vanes during operation. This arrangement thus permits a seal system at the vane ends in addition to the vane outer edge abutting the inside surface of the flexible band. By adding a seal between the vane surfaces which are sliding within the rotor guide slots formed within the spool ends, the whole vane/spool ends/belt surface/rotor outer circumference between two adjacent vanes can now be effectively sealed thereby improving the hydristor or pump efficiency to unparalleled levels at 97–98%. The spool ends simply mate with the end or wear plates shown in FIG. 1, for example.

Figure 24A:
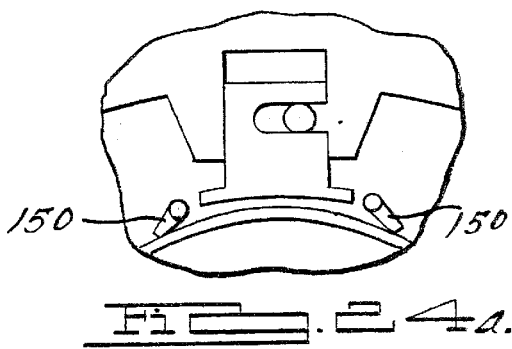
FIG. 24 illustrates a sealing mechanism.
Figure 24B:
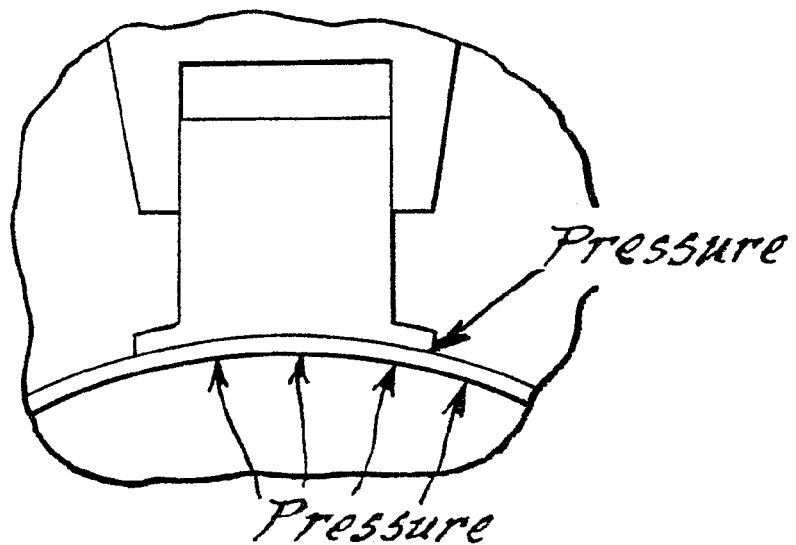

In yet another aspect of the invention, FIG. 24 illustrates a sealing mechanism wherein a pair of flaps are counter-bored into the wear plates if the rotor has open kidney ports adjacent thereto, and are spaced to flap against the piston edges as it moves flush with a flexible belt. Each piston thus has corresponding flaps that are operable upon the flush communication of the piston's contoured surface and the flexible belt. Volumetric efficiency is thereby enhanced.

In still yet another aspect of the invention, an improvement in the sealing of the invention described in U.S. Pat. No. 6,022,201 and in conventional designs includes an insert 152 slidably engaged within an arcuate groove 154 formed within the wear plate 155. See FIG. 25.

In conventional fixed displacement vane pumps and motors, there is a problem associated with equalizing the pressure at the radially inner and outer vane edges. Chamber pressure must be routed under the vane (at its radially innermost point) to equalize the radially inward force created by the chamber pressure existing between the radial outer edge of the vane and the inner surface of the flexible belt (or the chamber confining contour). This is true both for conventional fixed designs, and the hydristor variable belt design rotors described in U.S. Pat. No. 6,022,201. In conventional practice, satisfactory sealing has not yet been achieved in bidirectional designs. Either the routing grooves at the axial ends of two opposite chambers where pressure sealing is desired are extended to allow for sealing the vane for the full rotation across the sealing surface (see reference number 30 in FIG. 1, for example), or a compromise is made for all four sealing areas (reference number 30) i.e. the chamber groove to route oil only extends halfway. The first case works well for uni-directional operation and the second case works moderately acceptable for bi-directional operation.

In accordance with the present invention, a plurality of arcuate grooves are formed within the inner surface of the wear plate, each groove corresponding to an operable quadrant within the rotor. The grooves are symmetrically placed at the beginning of each quadrant and are formed in a sausage-link shape or in a shape that precludes slippage of the insert from within the channel or groove beyond a limited range. Therefore, each end of the groove comprises a narrower opening thereby precluding slippage of the insert once place therein. Additionally, each groove is thus formed at the 12, 3, 6, and 9 O'clock positions in an embodiment containing four pistons placed symmetrically about the rotor periphery.

The valve insert shown in FIGS. 25*a*–*c* is slidably engaged within a corresponding groove having an arcuate length approximately equal to the radially inner arcuate length existing between two juxtaposed vanes. As shown in FIGS. 25b and 25c, the insert has a pair of annuli 156 extending through the top of the insert for fluid flow therethrough. Thus fluid initially flowing beneath the insert is channeled through a right hole and then provides pressure over the top surface of the insert. A groove 158 is cut on the underside to facilitate the flow of fluid through the bottom and then out through the top of the insert. The valve insert thus responds to chamber fluidic pressure which drives the insert angularly over a small range within the groove so as to extend the vane underpressure for proper vane operation for a given pressure case. This is true for both rotational directions of the rotor. If any other chamber sees pressure, the inserts "switch" to extend the sealing as required for the particular case. This is even true for adjacent chambers as well as opposite chambers. Thus bi-directional volumetric efficiency is improved during single/dual pump operation, or any motor operation.

In yet another aspect of the invention, the hydristor pump described above may be employed in a classical freon (or freon oil) heat pump system, in accordance with the present invention. As shown in FIGS. 26 and 27, a hydristor super heat pump system 160 contains a hydristor heat pump/motor or hydristor compressor/expander 162. A closed compressible fluid (or refrigerant) loop 164 contains a closed first half loop 166 and a closed second half loop 168 and provides fluid communication throughout the system as the hydristor 162 pumps the compressible fluid 170 (or refrigerant) contained therein. A first heat exchanger 172 is connected integral to and in fluid communication with the first half loop 166 and provides heat transfer from a warm reservoir 174 such as the air or ambient environment to the refrigerant 170 traversing within the first half loop 166. A second heat exchanger 176 is connected in line to the second half loop 168 and provides heat transfer from a compressed stream of fluid 170 (such as liquid freon at about 300° F.) to a relatively cold reservoir 178 such as a home heating system or a Stirling Engine, for example.

In a preferred embodiment, the first half loop 166 is connected to at least one respective kidney port 180, 182 in each of the third and fourth quadrants 181 and 183, respectively, of the hydristor 160 (e.g. the first inlet and the second outlet, respectively), whereby the connections are sealed using gaskets or other seals to ensure a closed system. Additionally, the second half loop 168 is connected to at least one respective kidney port 184, 186 in each of the first and second quadrants 185 and 187, respectively, of the hydristor 162 (e.g. the first outlet and the second outlet, respectively), whereby the connections are also sealed to ensure a closed system 160.

In operation of a preferred embodiment, a startup motor 188 is operably connected to the hydristor 162 and is started to begin hydristor operation. The freon or refrigerant 170 sealed within the closed loop 164 then begins to flow based on hydristor operation. The refrigerant 170a, rarified freon at about −10° F. for example, flows into the inlet port 182 of the fourth quadrant 183 of the hydristor 162 and is compressed as it is transferred by the rotor 192 from its chamber 194 in the fourth quadrant 183 to the same compressed chamber in the first quadrant 185. The freon is thereby compressed to a liquid 170b at about 300° F. and then exits from the kidney port 184 in the first quadrant 185 and into the closed second half loop 168. Control pressure exerted on piston 3 alone thus pushes piston 3 and band 14 radially inward and reduces the volumetric capacity of the chamber 194 rotating from quadrant four 183 into quadrant one 185 and thereby compresses the cold rarified freon gas 170 into a hot freon liquid 170b. Pistons 6, 9, and 12 remain extended radially outward in their respective cylinders. Other piston control permutations are possible, so long as the general compression and expansion functions are retained as described above.

Figure 28:
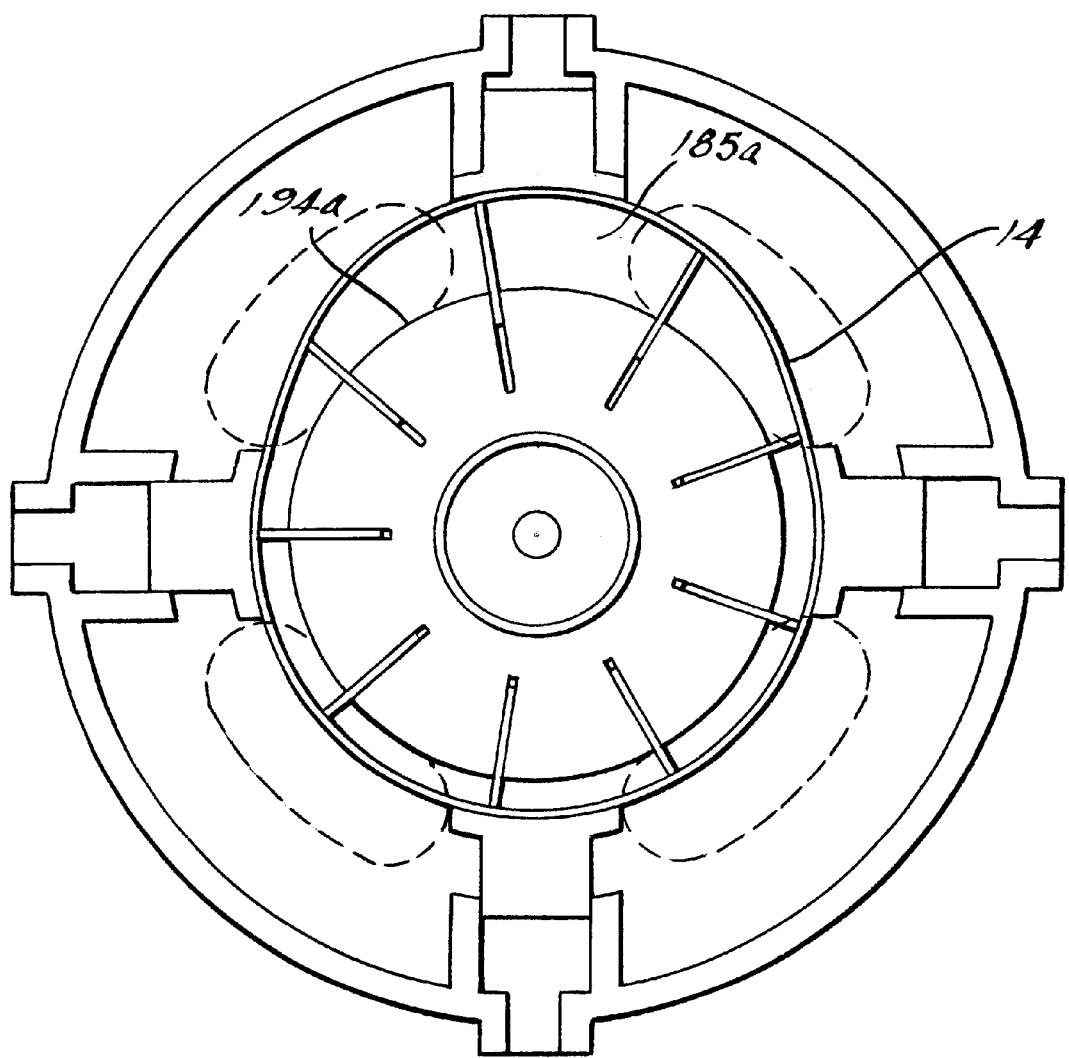
FIG. 28 is a view of a preferred embodiment of the heat pump wherein the control pressure or radially inward force applied to the pistons in clockwise orientation is greatest at the 3 o'clock position and least at the 12 o'clock position and stepwise reduced at the 6 and 9 o'clock positions.

For example, in a preferred embodiment shown in FIG. 28, the fluidic pressure applied to piston 3 is the greatest and therefore biases the piston 3 to the most radially inward point in the piston chamber. The volume in chamber 194a is therefore minimized in quadrant 185a providing a maximum pressure at the outlet 186a. The fluidic pressure applied to piston 6 is reduced such that the band 14 exerts a radially outward pressure, and the piston 6 thus extends radially inward only about half to three/quarters of the length of the piston chamber. The fluidic pressure applied to piston 9 is reduced such that the band 14 exerts a radially outward pressure, and the piston 9 thus extends radially inward only about one quarter to one half of the length of the piston chamber. Finally, no fluidic pressure is applied to piston 12 and as such piston 12 does not at all extend radially inward but is in fact maintained at a radially outward most point in its respective piston chamber. The stepwise reduction in the fluidic pressure applied to the pistons in clockwise orientation results in the gradual increase in volume in chamber 194a as it rotates clockwise from quadrant one 185a through quadrant four 183a. As a result, the shear heating effect normally exhibited by known expansion valves is avoided reducing the resultant heat and also effecting a stepwise increase in motor torque as the chamber rotates from quadrant one 185a through quadrant four 183a. An increase in motor torque directly translates to a reduction in energy usage.

Again referring to FIG. 26, as the freon liquid 170b at 300° F. passes through the second heat exchanger 176, the temperature preferably drops to about 140° F. The cooler freon stream 170c then enters at least one kidney port inlet 186 of the second quadrant 187 and is expanded as it travels from the second quadrant 187 to the third quadrant 181 via rotation of the rotor 192. In contrast to the compressor half 200 (i.e. quadrants four and one) of the hydristor 162 described above, the respective control pressure exerted on piston 3, but not on the other pistons, results in an increased volumetric capacity of the chamber 194 rotating from quadrant two 183 into quadrant three 181 (quadrants 181 and 183 forming expander half 201) and thereby expands the freon stream 170c at 140° F. to a rarified supercooled freon gas stream 170d at about −40° F. The supercooled freon 170d exits the third quadrant 181 through at least one kidney port 180 and enters the closed first half loop 166. From there, the supercooled stream 170d enters the first heat exchanger 172 and absorbs heat provided by the relatively warm reservoir such as the air. Upon exiting the first heat exchanger 172, the freon gas stream 170a is warmed to −10° F. for example. The rarified freon gas 170a or the compressible fluid then once again enters the fourth quadrant 183 to repeat the cycle.

The first and second heat exchangers 172 and 176 are preferably any nondirect heat conductor type such as a shell and tube heat exchanger, for example. Exemplary heat exchangers include those described in U.S. Pat. Nos. 6,340,052, 6,340,055, 6,341,650, 6,336,501, 6,019,168, and 6,325,140, each herein incorporated by reference.

The startup motor 188 may be any motor rated to supply the requisite power needed to activate the hydristor rotor. As the system design criteria such as piston control pressures and heat exchanger surface areas are tailored based on design factors such as the average temperatures of the warm and cool reservoirs and the heat transfer and pressure/vapor properties of the compressible fluid, the motor power rating will vary accordingly. Exemplary startup motors include those described in U.S. Pat. Nos. 6,346,810, 6,342,739, 6,340,856, 6,343,877, and 6,345,600, each herein incorporated by reference.

Since the hydristor 162 is actually a dual pump/motor or compressor/expander, the first half functions as a compressor and the second half functions as an expansion valve which acts as a motor to relax the freon pressure. The motor torque is subtracted from the external drive torque supplied by the system electric startup motor. Thus the system amplification will be much higher than the 300% exhibited by the state of the art heat pump, and more on the order of about 1000% or 10 times. In simple terms, the heat generated from this system when applied to home heating systems could therefore reduce the required power to 10% of the original amount as compared to conventional heating systems. Thermal considerations may arise due to the use of a single hydristor 162. For example, the high heat applied to the vanes and the rotor surface rotated to the very cold expansion area cause a loss of overall efficiency. Two hydristors on a common shaft connected to the startup motor may be used to overcome this concern. This would enable better thermal isolation if required, and thereby better efficiency and amplication (also called coefficient of performance of COP). Another factor concerning COP is that the individual hydristor control pistons may be individually controlled if desired resulting in variable performance to match the overall system conditions. The current practice of turning the drive or startup motor 188 on and off in a cyclical manner to drive a fixed or non-variable pump is inherently inefficient and thereby contributes to lesser COP ratings.

In yet another aspect of the invention, the hydristor super heat pump 162 described above may be utilized in conjunction with a Stirling Engine 178a (cold reservoir) and an electrical generator 196 as shown in FIG. 27. The addition of a Stirling Engine 178a results in the generation of electrical power as a result of the sun's daytime energy heating the air, which in turn is latent in the night air, even in winter, during rain, and during snow. The result in solar energy during day and night, summer and winter, and rain and snow. With such a relatively high COP for the hydristor super heat pump, the typical conversion efficiency for a Stirling Engine of 35% when combined with the hydristor super heat pump COP of 1000% or 10× results in a net conversion efficiency of 350%! As a result, when the Stirling engine 178a is combined with the hydristor super heat pump 162, the startup motor 188 may eventually be switched off completely to run the hydristor 162 on internal power with a net power balance left over to power a desired external electrical load 197 directly. Thus, power can be generated by the sun's energy with true zero emissions and no fuel required since the solar nuclear power plant, or the sun, supplies the fuel. This type of system would find application in home heating systems, solar cars, prop airplanes, ships and submarines whether night or day, thereby providing a continuous power source based on thermodynamic principles.

Exemplary Stirling engines are described in U.S. Pat. Nos. 6,019,168, 5,924,305, 6,195,992, 6,263,671, 5,934,076, 6,161,381 and 6,338,248, each herein incorporated by reference.

While the foregoing examples illustrate and describe the use of the present invention, they are not intended to limit the invention as disclosed in certain preferred embodiments herein. Therefore, variations and modifications commensurate with the above teachings and the skill and/or knowledge of the relevant art, are within the scope of the present invention.

I claim:

1. A heat pump system comprising:
   an hydristor comprising a first compressor half, a second expander half, a first inlet, a second inlet, a first outlet, and a second outlet wherein said first inlet and said first outlet fluidly communicate with said first compressor half and said second inlet and said second outlet fluidly communicate with said second expander half;
   a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;
   a compressible fluid contained within said closed compressible fluid loop;
   a first heat exchanger integral to and in fluid communication with said first closed half loop wherein said first heat exchanger provides heat to said compressible fluid;
   a second heat exchanger fluidly communicating with and connected in line to said second closed half loop wherein said second heat exchanger transfers or draws heat from said compressible fluid; and
   a Stirling engine thermodynamically communicating with said second heat exchanger and accepting heat therefrom,
   wherein during operation of said heat pump system, the compressible fluid passes through said first inlet and is compressed and then exits said first outlet into the second closed half loop, then through the second heat exchanger wherein heat is transferred to said Stirling engine, then into the second closed half loop, then into the second inlet and is expanded, then exits the second outlet, then into the first closed half loop, then into the first heat exchanger wherein heat is transferred to the compressible fluid, then into the first closed loop, thereby completing one pump cycle.

2. A heat pump system comprising:
   a hydristor comprising a first compressor half, a second expander half, a first inlet, a second inlet, a first outlet, and a second outlet wherein said first inlet and said first outlet fluidly communicate with said first compressor half and said second inlet and said second outlet fluidly communicate with said second expander half;
   a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;
   a compressible fluid contained within said closed compressible fluid loop;
   a first heat exchanger integral to and in fluid communication with said first closed half loop wherein said first heat exchanger provides heat to said compressible fluid; and
   a second heat exchanger fluidly communicating with and connected in line to said second closed half loop wherein said second heat exchanger transfers or draws heat from said compressible fluid, wherein during operation of said heat pump system, the compressible fluid passes through said first inlet and is compressed and then exits said first outlet into the second closed half loop, then through the second heat exchanger wherein eat is transferred to a relatively cold reservoir in thermodynamic communication therewith, then into the second closed half loop, then into the second inlet and is expanded, and then exits the second outlet, then into the first closed half loop, then into the first heat exchanger wherein heat is transferred to the compressible fluid, then into the first closed loop, thereby completing one pump cycle, and, said compressible fluid is freon and said freon is compressed to a liquid at about 300° F., then cooled by said second heat exchanger to about 140° F., then expanded to a rarified gas at about −40° F., then warmed by said first heat exchanger to about −10° F.

3. The heat pump system of claim 1 wherein said compressible fluid is freon and said freon is compressed to a liquid at about 300° F., then cooled by said second heat exchanger to about 140° F., then expanded to a rarified gas at about −40° F., then warmed by said first heat exchanger to about −10° F.

4. A heat pump system comprising:

an hydristor comprising a housing including an outer casing with a longitudinal axis and a pair of end plates enclosing the outer casing, a rotor with a plurality of radially extensible vanes within said housing, and means supporting the rotor for rotation about said longitudinal axis relative to the outer casing; a flexible band within said housing surrounding said rotor and in contact with an outer portion of each of said extensible vanes creating a fluid chamber; a plurality of individually controlled shape means abutting said flexible band and spaced around the circumference of said outer casing for controlling the shape of said flexible band; and at least two pairs of passageways in communication with said fluid chamber wherein a first pair comprises a first inlet and a first outlet and a second pair comprises a second inlet and a second outlet, each pair of said passageways extending through one of said end plates, wherein said rotor and said extensible vanes upon rotation about said longitudinal axis results in differential fluid flows between said two pairs of said passageways according to a selected shape of said flexible band, and, said hydristor comprises a first compressor half and a second expander half, such that said first inlet and said first outlet fluidly communicate with said first compressor half and said second inlet and said second outlet fluidly communicate with said second expander half;

a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;

a compressible fluid contained within said closed compressible fluid loop;

a first heat exchanger integral to and in fluid communication with said first closed half loop wherein said first heat exchanger provides heat to said compressible fluid;

a second heat exchanger fluidly communicating with and connected in line to said second closed half loop wherein said second heat exchanger transfers or draws heat from said compressible fluid; and a Stirling engine thermodynamically communicating with said second heat exchanger and accepting heat therefrom, wherein during operation of said heat pump system, the compressible fluid passes through said first inlet and is compressed and then exits said first outlet into the second closed half loop, then through the second heat exchanger wherein heat is transferred to said Stirling engine, then into the second closed half loop, then into the second inlet and is expanded, then exits the second outlet, then into the first closed half loop, then into the first heat exchanger wherein heat is transferred to the compressible fluid, then into the first closed loop, thereby completing one pump cycle.

5. A heat pump system comprising:

a hydristor rotary vane motor/pump comprising a first compressor half, a second expander half opposed to said first compressor half, a first inlet, a second inlet, a first outlet, and a second outlet wherein said first inlet and said first outlet fluidly communicate with said first compressor half and said second inlet an said second outlet fluidly communicate with said second expander half;

a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;

a compressible refrigerant contained within said closed compressible fluid loop;

a first heat exchanger integral to and in fluid communication with said first closed half loop wherein said first heat exchanger provides heat to said compressible fluid; and a second heat exchanger fluidly communicating with and connected in line to said second closed half loop wherein said second heat exchanger transfers or draws h at from said compressible fluid, wherein during operation of said heat pump system, the compressible fluid passes through said first inlet and is compressed to a liquid and then exits said first outlet into he second closed half loop, then through the second heat exchanger wherein heat is transferred to a relatively cold reservoir in thermodynamic communication therewith, then into the second closed half loop, then into the second inlet and is expanded to a gas, and then exits the second outlet, then into the first closed half loop, then into the first heat exchanger wherein heat is transferred to the compressible fluid, then into the first closed loop, thereby completing one pump cycle.

6. A heat pump system comprising:

a hydristor motor/pump comprising a first compressor half, a second expander half opposed to said first compressor half, a first inlet, a second inlet, a first outlet, and a second outlet wherein said first inlet and said first outlet fluidly communicate with said first compressor half and said second inlet and said second out et fluidly communicate with said second expander half;

a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;

a compressible fluid contained within said closed compressible fluid loop;

a first heat exchanger integral to and in fluid communication with said first closed half loop wherein said first heat exchanger provides heat to said compressible fluid; and a second heat exchanger fluidly communicating with and connected in line to said second closed half loop wherein said second heat exchanger transfers or draws heat from said compressible fluid, wherein said compressible fluid is freon, and, during operation of said heat pump system, the compressible fluid passes through said first inlet and is compressed and the exits said first outlet into the second closed half loop, then through the second heat exchanger wherein heat is transferred to a relatively cold reservoir in thermodynamic communication therewith, then into the second closed half loop, then into the second inlet and is expanded, and then exits the second outlet, then into the first closed half loop, then into the first heat exchanger wherein heat is transferred to the compressible fluid, then into the first closed loop, thereby completing one pump cycle.

7. A heat pump system comprising:

a hydristor comprising a first compressor half, a second expander half, a first inlet, a second inlet, a first outlet, and a second outlet wherein said first inlet and said first outlet fluidly communicate with said first compressor half and said second inlet and said second outlet fluidly communicate with said second expander half;

a closed compressible fluid loop integral with and in fluid communication with said hydristor, said closed compressible fluid loop containing a first closed half loop and a second closed half loop, said first closed half loop in fluid communication with said first inlet and said second outlet, and, said second closed half loop in fluid communication with said first outlet and said second inlet;

a compressible fluid contained within said closed compressible fluid loop;

a first heat exchanger integral to and in fluid communication with said first closed half loop wherein said first heat exchanger provides heat to said compressible fluid; and a second heat exchanger fluidly communicating with and connected in line to said second closed half loop wherein said second heat exchanger transfers or draws eat from said compressible fluid, wherein during operation of said heat pump system, the compressible fluid passes through said first inlet and is compressed and then exits said first outlet into the second closed half loop, then through the second heat exchanger wherein heat is transferred to a relatively cold reservoir in thermodynamic communication therewith, then into the second closed half loop, then into the second inlet and is expanded, and then exits the second outlet, then into the first closed half loop, then into the first heat exchanger wherein eat is transferred to the compressible fluid, then into the first closed loop thereby completing one pump cycle, and, said compressible fluid is a refrigerant compressible to a liquid at about 300° F., then coolable by said second heat exchanger to about 140° F., then expandible to a rarified gas at about −40° F., then warmable by said first heat exchanger to a out −10° F.

\* \* \* \* \*